(12) United States Patent
Jung et al.

(10) Patent No.: US 11,391,510 B2
(45) Date of Patent: Jul. 19, 2022

(54) DEVICE OF DETECTING ABNORMAL STATE AND METHOD OF DETECTING THEREOF

(71) Applicant: LG ELECTRONICS INC., Seoul (KR)

(72) Inventors: Jin-Hoon Jung, Seoul (KR); Yong-Hoan Kwon, Seoul (KR); Eunho Cha, Seoul (KR)

(73) Assignee: LG Electionics Inc., Seoul (KR)

( * ) Notice: Subject to any disclaimer, the term of this patent is extended or adjusted under 35 U.S.C. 154(b) by 403 days.

(21) Appl. No.: 16/397,359

(22) Filed: Apr. 29, 2019

(65) Prior Publication Data

US 2019/0331409 A1 Oct. 31, 2019

(30) Foreign Application Priority Data

Apr. 27, 2018 (KR) .................. 10-2018-0049353

(51) Int. Cl.
*F25D 29/00* (2006.01)
*H04L 12/28* (2006.01)

(52) U.S. Cl.
CPC ......... *F25D 29/005* (2013.01); *F25D 29/006* (2013.01); *H04L 12/2827* (2013.01);
(Continued)

(58) Field of Classification Search
CPC .. F25D 29/005; F25D 29/006; F25D 2700/02; F25D 2700/12; F25D 2700/14; H04L 12/2827; H04L 2013/285
See application file for complete search history.

(56) References Cited

U.S. PATENT DOCUMENTS

| 5,872,721 A * | 2/1999 | Huston ................. A23B 7/148 |
|---|---|---|
| | | 702/24 |
| 2014/0070951 A1* | 3/2014 | Shim .................... F25B 49/005 |
| | | 340/585 |

(Continued)

FOREIGN PATENT DOCUMENTS

| JP | H08271110 | 10/1996 |
|---|---|---|
| JP | 2002162149 | 6/2002 |

(Continued)

OTHER PUBLICATIONS

Extended European Search Report in European Application No. 19170845.2, dated Jan. 8, 2020, 11 pages.

*Primary Examiner* — Jonathan Bradford
(74) *Attorney, Agent, or Firm* — Fish & Richardson P.C.

(57) ABSTRACT

A refrigerator includes a temperature sensor; a door sensor; a compressor sensor; an ice sensor; a water sensor; and a defrost sensor. The refrigerator also includes a communication unit; a display unit; at least one processor; and at least one memory connected to the at least one processor and storing instructions that, when executed, perform operations including: sensing, through the plurality of sensors, sensing information related to the refrigerator; storing, in the at least one computer memory, (i) the sensing information, and (ii) time information; transmitting to at least one server, (i) the sensing information and the time information, and (ii) setting information for the refrigerating compartment or the freezer compartment; receiving information regarding an abnormal state of the refrigerator that is generated by a cloud server or a monitoring server based on the sensing information; and outputting display information related to the received information regarding the abnormal state.

12 Claims, 11 Drawing Sheets

(52) U.S. Cl.
CPC ...... *F25D 2400/36* (2013.01); *F25D 2700/02* (2013.01); *F25D 2700/12* (2013.01); *F25D 2700/14* (2013.01); *H04L 2012/285* (2013.01)

(56) References Cited

U.S. PATENT DOCUMENTS

| | | |
|---|---|---|
| 2015/0150088 A1 | 5/2015 | Haga et al. |
| 2016/0127144 A1* | 5/2016 | Takahashi ........... G06F 11/0709 |
| | | 705/27.1 |

FOREIGN PATENT DOCUMENTS

| | | | |
|---|---|---|---|
| JP | 2007305145 | 11/2007 | |
| KR | 101215097 | 12/2012 | |
| KR | 1020180003519 | 1/2018 | |
| WO | WO2014171119 | 10/2014 | |
| WO | WO-2015129085 A1 * | 9/2015 | ......... G05B 23/0221 |

* cited by examiner

DEVICE OF DETECTING ABNORMAL STATE AND METHOD OF DETECTING THEREOF

CROSS-REFERENCE TO RELATED APPLICATIONS

This application claims the benefit of an earlier filing date and right of priority to Korean Patent Application No. 10-2018-0049353, filed on Apr. 27, 2018, the disclosure of which is incorporated herein by reference in its entirety.

TECHNICAL FIELD

The present disclosure generally relates to determining an abnormal state of a device.

BACKGROUND

Electronic products are typically operated in various usage environments. Structures or components of electronic products are manipulated and altered by users in various ways during use of electronic products after the electronic products are manufactured and shipped. For example, users frequently turning-off and turning-off electronic products, such as a TV, can cause malfunctions in a power connection. As another example, an air conditioner including an outdoor unit and various mechanical or chemical components can operate in usage scenarios that can lead to a malfunction of the air conditioner. In general, the operational environment and usage of electronic products can lead to a variety of malfunctions.

SUMMARY

One general aspect of the present disclosure includes a refrigerator including: a plurality of sensors that includes: (i) a temperature sensor configured to sense a temperature of at least one of a refrigerating compartment or a freezer compartment of the refrigerator, (ii) a door sensor configured to sense at least one of an opening or a closing of a door of the refrigerator, (iii) a compressor sensor configured to sense an operation pattern of a compressor of the refrigerator, (iv) an ice sensor configured to sense at least one of an amount of ice or a state of the ice in the refrigerator, (v) a water sensor configured to sense at least one of an amount of water or a pressure of the water for the refrigerator, and (vi) a defrost sensor configured to sense frost that is generated in the refrigerator. The refrigerator also includes a communication unit. The refrigerator also includes a display unit. The refrigerator also includes at least one processor; and at least one computer memory operably connectable to the at least one processor and storing instructions that, when executed by the at least one processor, perform operations including: sensing, through at least one of the plurality of sensors, sensing information that is related to the refrigerator; storing, in the at least one computer memory, (i) the sensing information, and (ii) time information for the sensing information; and transmitting, through the communication unit to at least one server, (i) the sensing information and the time information that is stored in the at least one computer memory, and (ii) setting information for the at least one of the refrigerating compartment or the freezer compartment. The operations also include receiving, through the communication unit, information regarding an abnormal state of the refrigerator that is generated by at least one of a cloud server or a monitoring server based on the sensing information sensed by the at least one of the plurality of sensors; and controlling the display unit to output display information that is related to the received information regarding the abnormal state of the refrigerator. Other embodiments of this aspect include corresponding computer systems, apparatus, and computer programs recorded on one or more computer storage devices, each configured to perform the actions of the methods.

Implementations may include one or more of the following features. The refrigerator where the information regarding the abnormal state is generated by the cloud server based on an association between first sensing information and second sensing information, among a plurality of sensing information that is sensed by the plurality of sensors. The association between the first sensing information and the second sensing information relates to (i) the second sensing information not matching pattern information stored in the cloud server, and (ii) the cloud server determining that the second sensing information not matching the pattern information corresponds to the abnormal state, based on the first sensing information. The refrigerator where the abnormal state includes at least one of (i) a malfunction state of a first sensor that generates the first sensing information, or (ii) a malfunction state of a second sensor that generates the second sensing information. The refrigerator where at least one sensor, among the plurality of sensors, which generates the second sensing information includes at least one of the temperature sensor or the sensor of the compressor. The refrigerator where the operations further include: receiving, through the communication unit from the monitoring server, operation information for resolving the abnormal state, where the operation information includes information regarding at least one of (i) a customer service schedule, or (ii) setting information for resolving the abnormal state. The refrigerator where the operations further include: controlling the display unit to display information related to the customer service schedule. The refrigerator where the operations may also include accumulating and storing the sensing information that is sensed by the at least one of the plurality of sensors, with respect to the information regarding the abnormal state. The refrigerator where the operations further include: adaptively managing a transmission period or a sensing period for sensing information, depending on the at least one of the plurality of sensors. The refrigerator where a first value of the transmission period or the sensing period after the abnormal state has been resolved is less than a second value of the transmission period or the sensing period before the abnormal state has been resolved. Implementations of the described techniques may include hardware, a method or process, or computer software on a computer-accessible medium.

Another general aspect includes a cloud server including: a communication unit. The cloud server also includes at least one processor; and at least one computer memory operably connectable to the at least one processor and storing instructions that, when executed by the at least one processor, perform operations including: receiving, through the communication unit from a first refrigerator, sensing information that is sensed at a first time point and a second time point by a plurality of sensors of the first refrigerator; storing, in the at least one computer memory, (i) the sensing information and (ii) pattern information for determining an abnormal state of the first refrigerator; comparing the pattern information that is stored in the at least one computer memory with the sensing information that was sensed at the first time point and the second time point; determining, based on comparing the pattern information with the sensing information, whether the first refrigerator is in the abnormal state; generating information regarding the abnormal state based on determining that the sensing information indicates an abnormal state of the first refrigerator; and transmitting, through the communication unit to the first refrigerator or to a monitoring server, the information regarding the abnormal state. Other embodiments of this aspect include corresponding computer systems, apparatus, and computer programs recorded on one or more computer storage devices, each configured to perform the actions of the methods.

Implementations may include one or more of the following features. The cloud server where the information regarding the abnormal state is generated based on an association between first sensing information and second sensing information, among a plurality of sensing information that is sensed by the plurality of sensors of the first refrigerator. The cloud server where the association between the first sensing information and the second sensing information relates to (i) the second sensing information not matching the pattern information, and (ii) a determination that the second sensing information not matching the pattern information corresponds to the abnormal state, based on the first sensing information. The cloud server where the abnormal state includes at least one of (i) a malfunction of a first sensor that generates the first sensing information, or (ii) a malfunction of a second sensor that generates the second sensing information. The cloud server where at least one sensor, among the plurality of sensors of the first refrigerator, which generates the second sensing information includes at least one of (i) a temperature sensor, or (ii) a sensor of a compressor of the first refrigerator. The cloud server where the operations further include: accumulating and storing first pattern information regarding a normal pattern and second pattern information regarding an abnormal pattern that are generated based on aggregate sensing information that is sensed by the first refrigerator and by a plurality of second refrigerators. The cloud server where the operations also include storing, in the at least one computer memory, the first pattern information and the second pattern information. The cloud server where generating the information regarding the abnormal state of the first refrigerator includes: determining information regarding a first abnormal state of a compressor of the first refrigerator, based on compressor sensing information that is sensed by a compressor sensor, where the compressor sensor is configured to sense (i) an operation pattern of the compressor of the first refrigerator, (ii) a continuous operation time of the compressor of the first refrigerator, and (iii) an operation cycle of the compressor of the first refrigerator. The cloud server where generating the information regarding the abnormal state of the first refrigerator includes: comparing (i) temperature information related to temperatures that are sensed by and received from the first refrigerator, and (ii) pattern information related to an operation pattern of a compressor of the first refrigerator that is generated based on compressor sensing information that is sensed by a compressor sensor; determining a first abnormal state of the compressor of the first refrigerator based on comparing the temperature information and the pattern information; and generating the information regarding the abnormal state, based on the first abnormal state of the compressor. The cloud server where generating the information regarding the abnormal state of the first refrigerator includes: receiving, through the communication unit, (i) temperature information related to sensing a temperature of at least one of a refrigerating compartment or a freezer compartment of the first refrigerator, and (ii) door information related to sensing at least one of an opening or a closing of a door of the first refrigerator; generating the information regarding the abnormal state based on (i) a magnitude of a temperature change according to the temperature information, (ii) a time duration to reduce the magnitude of the temperature change, and (iii) the door information related to sensing at least one of the opening or the closing of the door. The cloud server where generating the information regarding the abnormal state of the first refrigerator includes: generating the information regarding the abnormal state based on (i) comparing at least one of the temperature information or the door information with the stored pattern information, and (ii) a change in the temperature information exceeding a threshold range of the pattern information, where the change in the temperature information relates to a change in time or a change in temperature of the temperature information. The cloud server where generating the information regarding the abnormal state of the first refrigerator includes: generating the information regarding the abnormal state with respect to an opening of a door of the first refrigerator, based on the door information, and based on the temperature information indicating that the sensed temperature is continuously increased or decreased for a predetermined time range; and transmitting, through the communication unit to the first refrigerator, the information regarding the abnormal state of the first refrigerator. Implementations of the described techniques may include hardware, a method or process, or computer software on a computer-accessible medium.

Another general aspect includes a method of detecting an abnormal state by a monitoring server, the method including: receiving, through a communication unit of the monitoring server, (i) information regarding an abnormal state of a first refrigerator, and (ii) sensing information with respect to the information regarding the abnormal state. The method also includes controlling a monitoring display unit to output displayed information that is related to (i) the information regarding the abnormal state and the sensing information, and (ii) user information related to the first refrigerator. The method also includes transmitting, through the communication unit or through the monitoring display unit to the first refrigerator, (i) operation information for resolving the abnormal state, and (ii) the information regarding the abnormal state. Other embodiments of this aspect include corresponding computer systems, apparatus, and computer programs recorded on one or more computer storage devices, each configured to perform the actions of the methods.

Implementations may include one or more of the following features. The method where the monitoring display unit receives at least one of the operation information or the information regarding the abnormal state via a call or a message through a telephone number that is included in the user information, and stores the received information in at least one computer memory. The method where the operation information includes information regarding at least one of (i) a customer service schedule, or (ii) setting information for resolving the abnormal state. Implementations of the described techniques may include hardware, a method or process, or computer software on a computer-accessible medium.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Systems and techniques are disclosed herein that enable determination of an abnormal state of one or more home appliances, such as refrigerators. An abnormal state may, in some scenarios, be proactively identified during operation of the home appliances, before the abnormality causes a failure of the home appliances.

According to some implementations, a state of the home appliances may be transmitted (e.g., continuously transmitted) to a server, an abnormal state or a normal state may be determined by the server based on the received information.

As an example, a service center may determine a state of the home appliances based on accumulated sensing information, and may provide an appropriate service based on the sensing information. Such service may be provided even if a user does not correctly explain a state of the home appliance when the user applies for customer service, thus providing improved for the user.

In some implementations, the abnormal state of the home appliances may be resolved by proactively determined the abnormal state occurring during operation of the home appliances, before the abnormality causes failure of the home appliances.

In some implementations, a cloud server may determine the abnormal state or a normal state of home appliances based on information received from the home appliances. For example, sensing information from various sensors of the home appliances may be transmitted (e.g., continuously) to the cloud server.

As such, in some scenarios, even if a user of the home appliance does not accurately explain the state of the home appliance when the user applies for customer service, a service center may determine the state of the home appliances based on the accumulated sensing information, and thus provide an appropriate service to the home appliance of the user.

Effects of implementations of the present disclosure are not limited to the effects described above, and those skilled in the art of the present disclosure can easily understand the various effects of the present disclosure based on the disclosure of the present disclosure A refrigerator may be impacted mechanically or electrically as the refrigerator is frequently used. As a result, various kinds of abnormality, such as an abnormal change in the property of a refrigerant or an abnormal change in the operation of a compressor, may occur. As it may be difficult to easily determine a cause of the abnormal state, a user may not be able to correctly resolve the abnormal state of the refrigerator, and may require a service representative to visit the user's site where the refrigerator is installed and resolve the abnormality of the refrigerator.

In some systems, a refrigerator may provide (e.g., via wireless communication) diagnostic information or state information of the refrigerator through a portable terminal. For example, the refrigerator may transmit and receive user information to and from the portable terminal.

Figure 1:
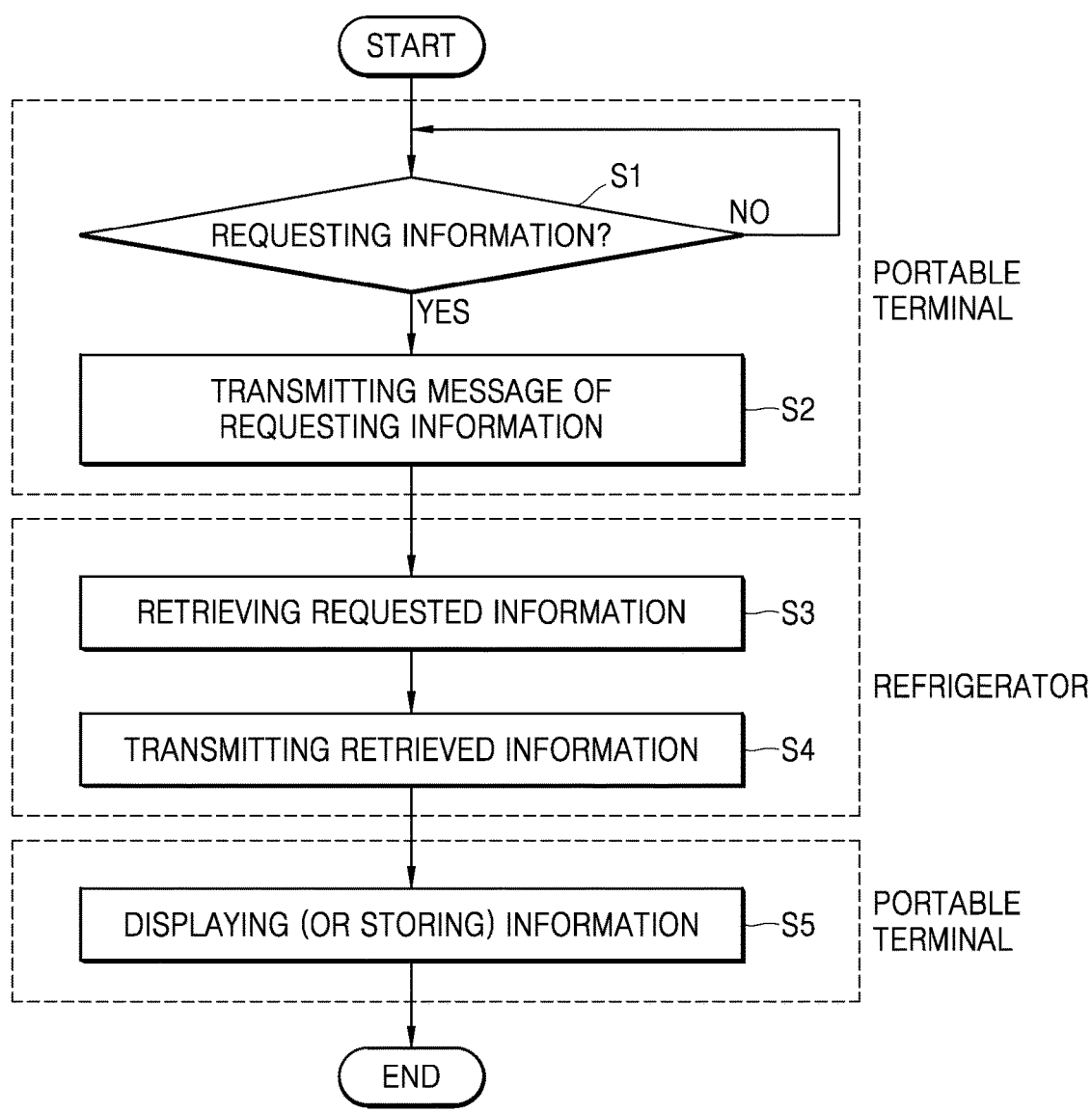
FIG. 1 shows an example of a process of transmitting and receiving information between a refrigerator and a portable terminal.

FIG. 1 shows an example of a process of transmitting and receiving information between the refrigerator and the portable terminal.

In this example, first, it is determined that a portable terminal receives an information request from the user (S1), and the portable terminal transmits an information request message to the refrigerator (S2). The refrigerator retrieves the requested information (S3) and transmits the retrieved information back to the portable terminal (S4). The portable terminal displays and stores the received information (S5). The steps of FIG. 1 may be performed when the user desires to determine the state of a refrigerator through the portable terminal.

However, as shown in FIG. 1, a basic state of the refrigerator is only determined based on limited information of the refrigerator. As such, there may be a limitation to the effectiveness of determining an abnormal state of the refrigerator. In particular, the example of FIG. 1 does not show a content of determining the state of the refrigerator as being abnormal or normal. However, FIG. 1 shows that information is confirmed through the portable terminal.

Therefore, the example in FIG. 1 does not suggest how to generally determine an abnormal state of the refrigerator, and does not suggest how to use the received state information in any particular manner to detect an abnormal state. Accordingly, the example of FIG. 1 is generally unable to determine and transmit information regarding an abnormal state of electronic products, such as a TV, an air conditioner, a refrigerator, and the like, to a customer in real time or at a predetermined time interval. Therefore, there is generally a need for determining an abnormal state of electronic products, such as refrigerators, to enable more efficient response to the determined abnormal state.

Hereinafter, implementations of the present disclosure will be described in detail with reference to the accompanying drawings so that those skilled in the art can easily carry out the present disclosure.

In order to clearly describe the implementations, the description irrelevant to the implementations has been omitted. Same or like reference numerals designate same or like components throughout the specification. Further, some implementations will be described in detail with reference to the illustrative drawings. Regarding the reference numerals assigned to the components in the drawings, it should be noted that the same components will be designated by the same reference numerals, wherever possible, even though they are shown in different drawings. Furthermore, in relation to describing the present disclosure, the detailed description of well-known related configurations or functions can be omitted when it is deemed that such description may cause ambiguous interpretation of the present disclosure.

In addition, in relation to implementing the present disclosure, features of the present disclosure may be described as being performed by separate components for ease of explanation. However, these features may be implemented by a single device or module, or one feature may be implemented by several devices or modules.

In the present disclosure, a refrigerator will be described as an example that enables monitoring an abnormal state of a device. According to the present disclosure, an abnormal state generally refers to the device not operating normally, but is not necessarily limited to a failure state of the device. That is, an abnormal state of the device can include both a state before failure of the device, as well as a failure state of the device.

As described above, home appliances, such as a refrigerator, typically have very complex operation states, which can include various possibilities of abnormal states. Thus, in some scenarios, a more nuanced determination of abnormal states may be beneficial. According to implementations of the present disclosure, an example of a refrigerator will be mainly described. However, implementations of the present disclosure are not limited to a refrigerator, and may be applied to various types of products that transmit information regarding an operation state generated when a communicable electronic product operates (e.g., continuously) to a cloud server and receives a result of determining information regarding the operation state.

According to implementations of the present disclosure, a refrigerator is described as a device that refrigerates or freezes a stored product. Refrigerators include various types of refrigerating and freezing devices, such as a general refrigerator that stores food, a special-purpose refrigerator designed for particular food items, a beverage refrigerator, a household refrigerator, a commercial refrigerator, and a freezing device having only a freezer. Further, implementations of the present disclosure may also be applied to a device that refrigerates stored goods, other than food, such as a cosmetics refrigerator. Further, a refrigerating device installed in a large refrigerating trailer, which may be a portable type, may also be applicable to implementations described in the present disclosure.

According to some implementations of the present disclosure, the refrigerator may collect information regarding a state (e.g., an internal state) of the refrigerator based on various communication protocols and transmit the collected information to an external cloud server. In one implementation, the communication may be made via WiFi, but the present disclosure is not limited thereto.

Figure 2:
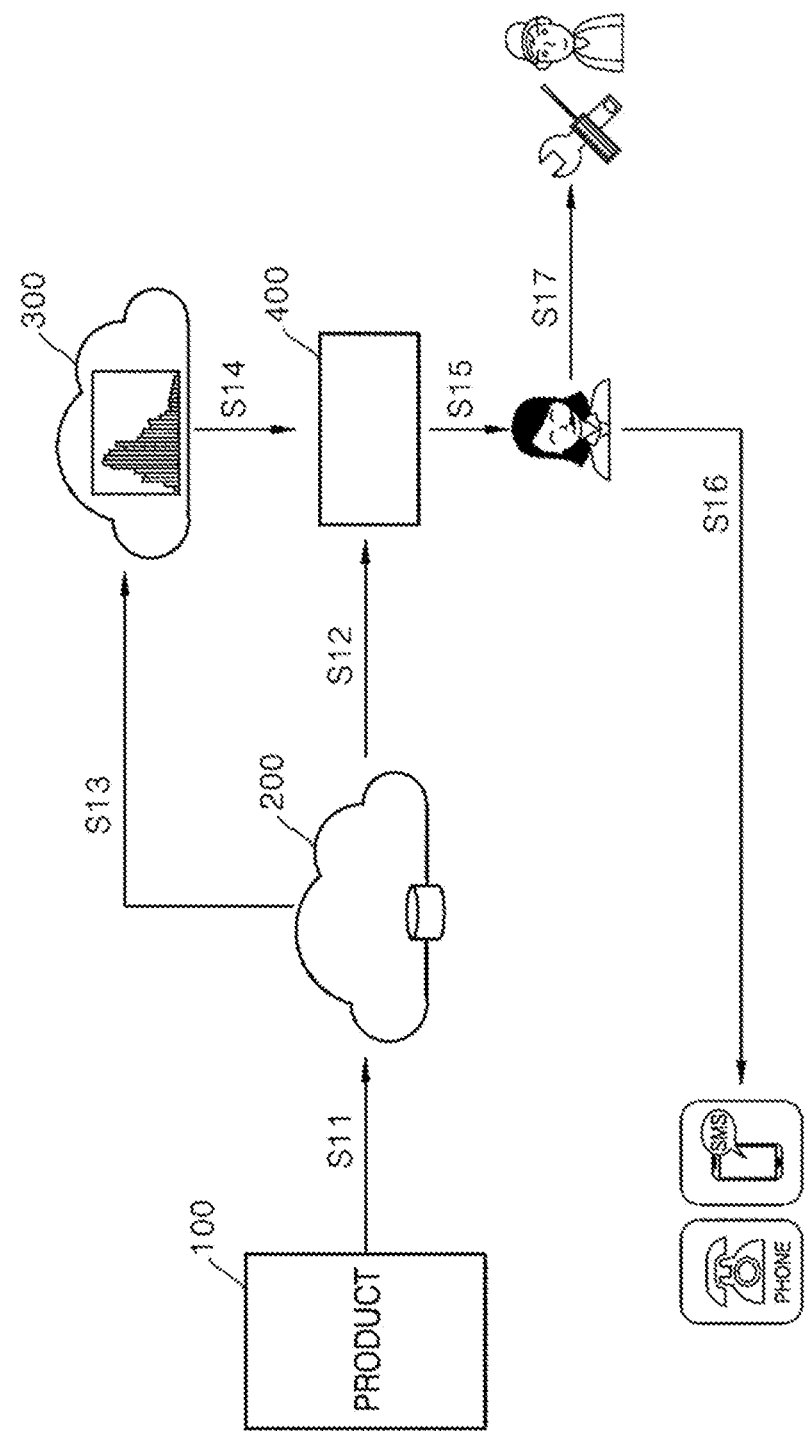
FIG. 2 shows an example of a process of transmitting operation information of a device to a server according to an implementation of the present disclosure.

FIG. 2 shows an example of a process of transmitting operation information of a device to a server according to an implementation of the present disclosure. In one implementation, the device is a refrigerator 100 having a plurality of components. The refrigerator 100 transmits operation information regarding monitoring of the components (e.g., for a predetermined time interval, such as in units of seconds or minutes) to at least one server, such as cloud server 200 (S11).

Monitoring of the components of the refrigerator may be performed in various ways, for example, by checking an opening and closing of a door, changes in temperature or humidity, a circulation of a refrigerant, an operation of a compressor, and the like. In scenarios where the product is another device different from the refrigerator, various kinds of operation information generated by the device may be transmitted to the cloud server 200. The transmission may be performed via Wi-Fi as exemplified in S11.

Based on the transmitted operation information, one or more servers (e.g., the cloud server 200 and/or other servers) may analyze the operation information and determine an abnormal state of the refrigerator 100.

For example, the cloud server 200 may compare and analyze the received operation information together with previous operation information of the product. In some scenarios, the cloud server 200 may transmit data (e.g., encoded data) based on the analysis to a monitoring server 400 of a call center (S12). For example, the cloud server 200 may analyze the received operation information and determine and/or predict an abnormal state of the product based on comparison data that is different from the received data, or previous data of the product, and the like. When the abnormality of the product is determined, the cloud server 200 may perform various operations. For example, the information and the abnormal state of the product may be transmitted to a monitoring server 400 of the call center.

The monitoring server 400 of the call center may determine whether the abnormal state occurs during an operation of the device based on the information provided by the cloud server 200 or the analysis server 300. According to some implementations, the monitoring server 400 of the call center may determine the status of the device before the abnormal state has occurred, based on the information provided by the cloud server 200 or the analysis server 300.

In some implementations, the cloud server 200 transmits the encoded data with respect to the received operation information to a separate analysis server 300 (S13). The analysis server 300 may analyze the encoded data. In some scenarios, the cloud server 200 may be integrated with the analysis server 300, or the cloud server 200 may be separate from the analysis server 300. The analysis server 300 generates a diagnostic result regarding an operation of the refrigerator based on the received encoded data and transmits the generated diagnostic result to the monitoring server 400 of the call center (S14).

When the abnormal state is determined, the monitoring server 400 may perform various operations, such as controlling a notification message to be transmitted to a monitoring representative (S15). The detected abnormal state may enable the monitoring representative to perform various operations. For example, the monitoring representative may call or send a message to a contact number of an owner of the device and notifies the owner of the device of a method of resolving the abnormal state (S16). Alternatively, the monitoring representative may transmit the information to a customer service representative in order to repair the device (S17). These example two operations, S16 and S17, may be performed sequentially or simultaneously to adjust a visit schedule of the customer service representative in consideration of schedule of the owner of the device and the customer service representative.

The example of the process of FIG. 2 is summarized as follows. When products (e.g., home appliances) installed in the house transmits operation information of the product to the cloud server 200 using a communication method such as Wi-Fi (S11), the cloud server 200 determines the abnormal state of the product or predicts a possibility of occurrence of the abnormal state based on the received data. When the cloud server 200 determines the abnormal state of the product, the information and abnormal contents of the product may be transmitted to the monitoring server 400 of the call center (S12).

In this process, analysis information on the abnormal state analyzed by the analysis server 300 (arranged in the cloud server 200 or separately from the cloud server 200) may also be transmitted to the monitoring server 400 (S14). As such, the monitoring representative of the call center may contact the customer and a repair person to set a schedule of repair visit to resolve the abnormal state.

According to an implementation, the information regarding the abnormal state described later is generated by the cloud server 200 based on first sensing information and second sensing information having an association with each other among the sensing information sensed by various sensors arranged in the refrigerator 100. If the second sensing information is not matched with pattern information stored in the cloud server 200, then the cloud server 200 may determine a state corresponding to the second sensing information that is not matched with the pattern information as an abnormal state based on the first sensing information, and generate information regarding the abnormal state. The association between the different sensing information may indicate a relation of sensors that generate the sensing information and sensing data that is generated by the sensors.

For example, second sensing information sensed by a second sensor that is not matched with pattern information may correspond to the second sensing information relating to an abnormal change in the temperature value of the temperature sensor, an abnormal state of an operation of a compressor sensed by a sensor of the compressor, and the like. The pattern information may, in some implementations, be accumulated during operation of refrigerators as big data, and the pattern information may be verified. In some implementations, the pattern information may be compared with a combination of sensed value of each refrigerator. The pattern information may be compared with a changed value of each refrigerator's sensor.

In some implementations, the cloud server 200 may determine whether a refrigerator is in an abnormal state, even if the second sensing information is not matched with the pattern information. Such a determination may be made based on the first sensing information generated by other sensors being different from the second sensor, and having an association therewith.

For example, even in scenarios where information sensed by a sensor is not included in a range of a normal pattern or is determined to match an abnormal pattern, such scenarios may not always directly indicate an abnormal state. Instead, in some implementations, an accuracy of determining the abnormal state may be further enhanced based on the information sensed by other sensors.

In such scenarios, the abnormal state may include a malfunction state of a first sensor that generates the first sensing information or a malfunction state of a second sensor that generates the second sensing information.

Further, a sensor that generates the second sensing information compared with the normal pattern or the abnormal pattern may include a sensor that continuously monitors changes in states of the refrigerator, such as a temperature sensor or a sensor of a compressor. In some implementations, the second sensing information may be generated by a sensor that determines a state of ice or measures water quantity and water pressure, or senses a defrost cycle or a defrost state.

Alternatively, some sensors among the sensors that generate the second sensing information may be included in the sensors that generate the first sensing information. As such, the cloud server 200 (and/or other servers) may determine the abnormal state of the refrigerator based on the information sensed by the two or more sensors having an association with each other. Further details of such implementations are described below.

Figure 3:
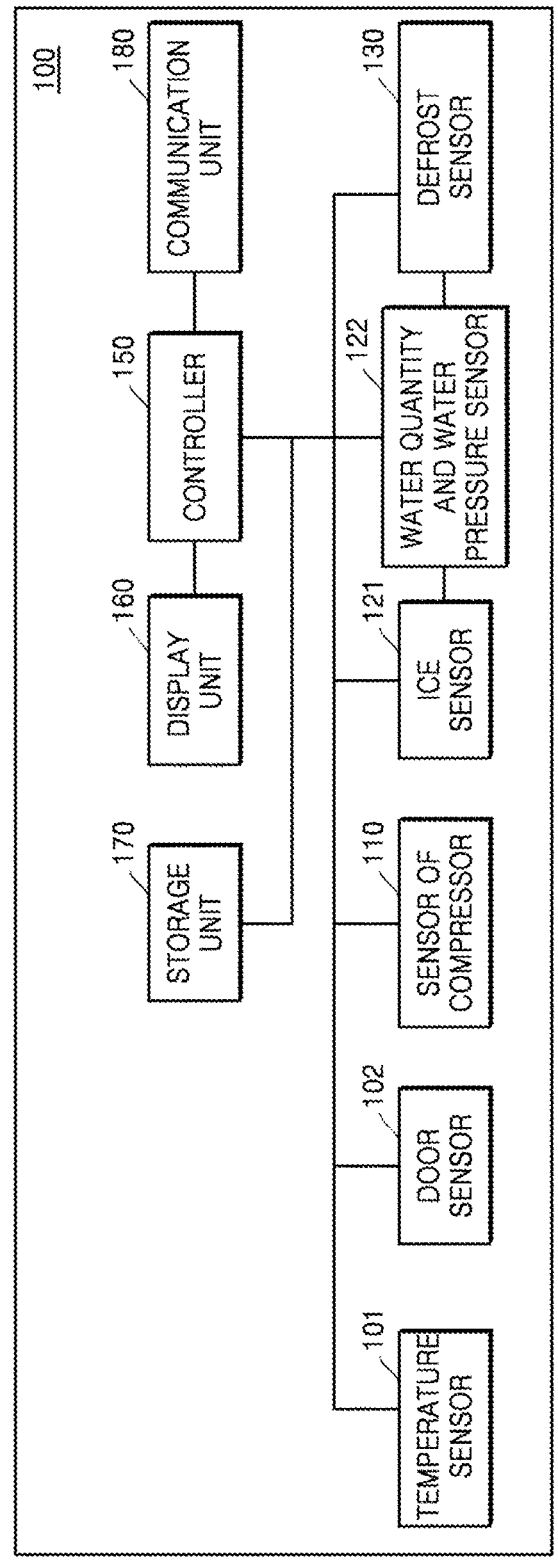
FIG. 3 shows an example of a configuration of a refrigerator according to an implementation of the present disclosure.

FIG. 3 shows an example of a configuration of a refrigerator according to an implementation of the present disclosure. Although FIG. 3 does not expressly show certain components of a refrigerator, such as a door, a compressor, a motor of compressor, and the like, such components of the refrigerator are understood to be implemented and are described below with reference to sensing and processing information related to such components.

The refrigerator 100 may include various types of sensors. Examples of such sensors include a temperature sensor 101 that senses the temperatures of a refrigerating compartment and a freezer compartment, a door sensor 102 that senses an opening and closing of a door, a sensor of a compressor 110 that senses an operation pattern of the compressor, an ice sensor 101 that senses an amount of ice used and a state of ice, a water quantity and water pressure sensor 122 that senses an amount of water used and a water pressure, and a defrost sensor 130 that monitors a defrost cycle or senses frost or senses a defrost state of refrigerator may be provided as an exemplary configuration of the sensors. A water quantity and water pressure sensor 122 may include a flow sensor. An operation pattern of the compressor may include information regarding a pattern of a compressor's operation mode, for example, a mode of compressing, a mode of discharging, a mode of evaporating, a mode of condensing, and the like.

At least one computer memory, such as a storage unit 170, stores various information related to the sensors, for example, the sensing information sensed by the sensors together with time information related to the sensing information. Such information stored in the storage unit 170 may, in some scenarios, be erased after a predetermined period of time. However, in some implementations, when the abnormal state is determined, the information related to the abnormal state may be accumulated and stored so as not to be erased.

A communication unit 180 transmits, in some implementations, stored information (e.g., sensing information and time information), as well as setting information for the refrigerating compartment and/or the freezer compartment to at least one server, such as cloud server 200.

A display unit 160 outputs various kinds of information. For example, audio data such as sound, and image data such as characters and images may be outputted.

At least one processor, such as a controller 150, controls the sensors, the storage unit 170, the communication unit 180, and the display unit 160. For example, in some implementations, the controller 150 adjusts an interval at which sensing information is transmitted to the server or an interval at which the sensor performs sensing. When the communication unit 180 receives (e.g., from a cloud server 200 or a monitoring server 400) information regarding an abnormal state that was generated based on the sensing information sensed by the sensor, the controller 150 may perform various operations, such as controlling the display unit 160 to display an output related to the received information regarding the abnormal state.

The controller 150 may adjust an interval at which the sensing information is transmitted or an interval at which the sensor senses. For example, the transmission may be performed at a preset interval, and subsequently, if an abnormal state is determined, then an interval at which the sensing information is transmitted may be increased or decreased from the preset interval.

For example, the controller 150 may adjust a sensing period after the information regarding the abnormal state is received. The controller 150 may manage a transmission period of the sensing information in a different manner depending on the sensors. Further, after the communication unit 180 receives the information regarding the abnormal state, the controller 150 may set the transmission period or the sensing period of the sensing information sensed by the sensor with respect to the information regarding the abnormal state to be less than the transmission period or the sensing period before the information regarding the abnormal state is received.

When an abnormal state is determined, in some implementations, the related sensors may generate sensing information more frequently for more accurate or detailed monitoring. For example, in FIG. 3, when the temperature sensor 101 is sensing changes in temperature at time intervals of one minute, if the refrigerator 100 receives information regarding an abnormal state indicating an abnormal change in temperature, then the controller 150 may transmit the information regarding the abnormal state to at least one server at smaller time intervals (e.g., 30 seconds) at which the temperature is sensed.

Further, the communication unit 180 may receive, from the monitoring server 400, operation information to resolve the abnormal state. According to some implementations, the information regarding the abnormal state may indicate an abnormal state of a particular component of the refrigerator. Further, according to some implementations, the operation information may include information regarding a customer service schedule or setting information (e.g., optimal setting information) to resolve the abnormal state. The customer service schedule may include a schedule for a representative to visit the user's site and resolve the abnormal state of the device. Further, a schedule to resolve the abnormal state in a remote manner may also be included in a customer service schedule.

Optimal setting information may, for example, include setting information that a user of a refrigerator 100 should set in order to resolve the abnormal state of the device. For example, if the temperature of the refrigerator is wrongly set (e.g., set too low or set too high), then the optimal setting information may include guidance message to inform the user to adjust the temperature of the refrigerator or information that enables activating an optimal setting.

According to some implementations, in the example configuration of FIG. 3, the abnormal state may be determined for home appliances, such as a refrigerator 100, in a proactive manner so as to mitigate problems where the abnormality causes a failure of the home appliance. To this end, various kinds of information generated by the refrigerator 100 may be transmitted to at least one server, such as the cloud server 200, by the communication unit 180. Based on this information, at least one server, such as the cloud server 200 and/or an analysis server 300 that cooperates with the cloud server 200, determines that the refrigerator is in an abnormal state by comparing the received information with pattern information, and provides the information regarding the abnormal state to the monitoring server 400.

Alternatively, in some implementations, the cloud server 200 may directly provide the information regarding the abnormal state to the refrigerator 100. As a result, a user of the refrigerator 100 or a customer service representative for the refrigerator 100 who becomes aware of the abnormal state of the refrigerator 100 may recognize the abnormal state of the refrigerator 100 and may take measures to resolve the current abnormal state of the refrigerator.

In some implementations, the controller 150 may display, on the display unit 160, information regarding a customer service schedule. Further, in some implementations the controller 150 may accumulate and store the information sensed by the sensor as the information regarding the abnormal state and store the accumulated sensed information in the storage unit 170 in order to accumulate and store information required for the customer service.

For example, when changes in the temperature of the refrigerator is detected as being abnormal (e.g., as a result of sensing the temperature), the controller 150 may accumulate and store, in the storage unit 170, information regarding sensing of the temperature, so that the temperature change is accurately determined. This kind of information may be a basis for accurately confirming the information sensed by the representative and determining the problem of the refrigerator 100 during customer service.

Figure 4:
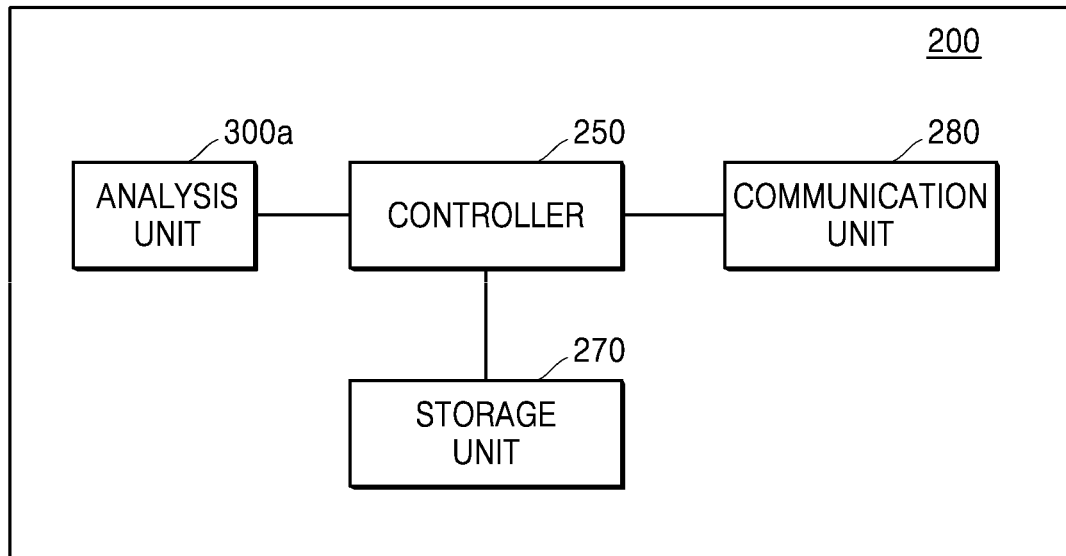
FIG. 4 shows an example of a configuration of a cloud server according to an implementation of the present disclosure.

FIG. 4 shows an example of a configuration of a cloud server according to an implementation of the present disclosure. As was discussed in regards to FIG. 2, one or more servers, such as cloud server 200, receives (e.g., continuously) sensing information from the devices such as a refrigerator and determines an abnormal state based on accumulated information. For convenience of explanation, a relation between a refrigerator and a cloud server will be mainly described.

In the example of FIG. 4, a communication unit 280 receives sensing information from a plurality of refrigerators. The communication unit 280 receives sensing information sensed at a first time point from a first refrigerator. A storage unit 270 stores sensing information received by the communication unit 280. In addition, the storage unit 270 also stores pattern information. The pattern information may reflect standardized information for an operation of the refrigerator or may reflect criteria that is to be compared with various kinds of sensing information to determine an abnormal state.

A controller 250 compares the pattern information stored in the storage unit 270 to determine the abnormal state based on the sensing information received by the communication unit 280 and the sensing information (for example, sensing information sensed by the first refrigerator at the first time point and the second time point) on the first refrigerator at various time points in order to determine the information regarding the abnormal state.

When the information regarding the abnormal state is determined by a controller 250, the communication unit 280 may transmit information regarding the abnormal state to the first refrigerator or a monitoring server 400.

In this process, the pattern information may be updated or replaced after being stored in a storage unit 270 at a regular interval. For example, in scenarios where an analysis unit 300a is included in the cloud server 200, the analysis unit 300a may accumulate and store the information regarding a normal pattern and information regarding an abnormal pattern generated based on the sensing information sensed by the first refrigerator and the plurality of second refrigerators. The cloud server 200 may provide such pattern information to the storage unit 270. If an analysis server 300 is provided as a separate external device, the analysis server 300 may provide the accumulated information regarding a normal pattern and the information regarding the abnormal pattern to the cloud server 200 based on a communication protocol.

The information regarding a normal pattern may include accumulated sensing information that is gathered during the refrigerator's normal operation. For example, the information regarding the normal pattern may include sensed values of a normal state of refrigerator. The information regarding the abnormal pattern may include accumulated sensing information that is gathered during the refrigerator's abnormal operation. For example, the information regarding the abnormal pattern may include sensed values of an abnormal state of refrigerator.

Alternatively, the analysis server 300 may compare the sensed information provided by the cloud server 200 with the information regarding the normal pattern and the information regarding the abnormal pattern, and directly notify the monitoring server 400 of the abnormal state.

Figure 5:
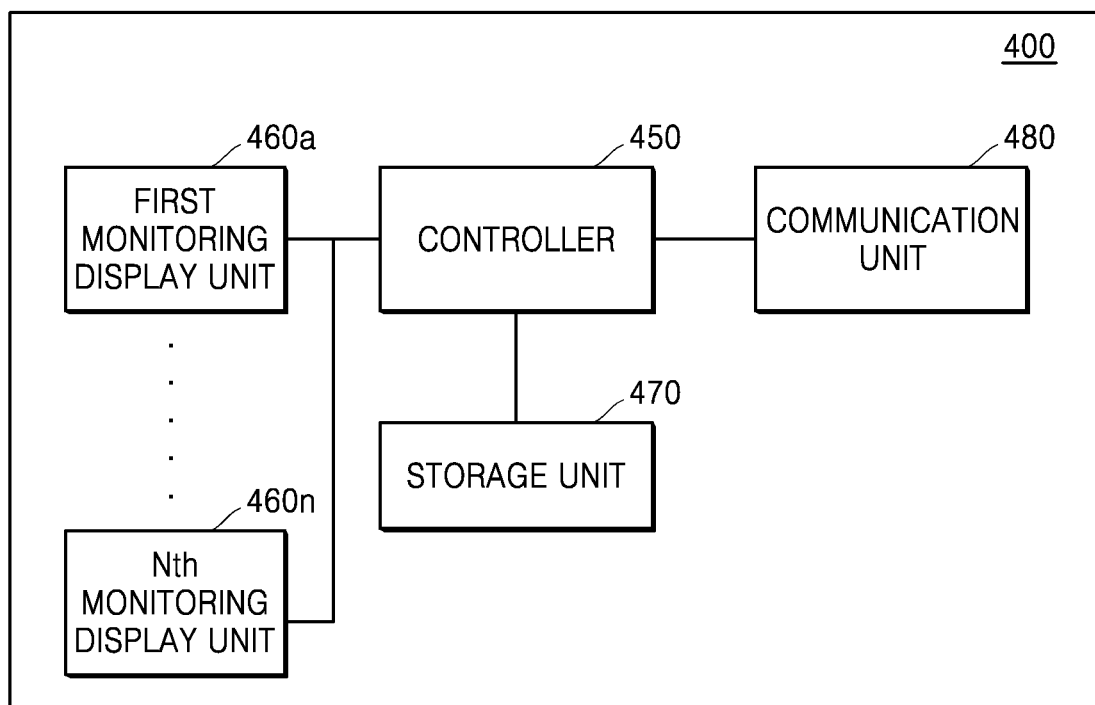
FIG. 5 shows an example of a configuration of a monitoring server according to an implementation of the present disclosure.

FIG. 5 shows an example of a configuration of a monitoring server according to an implementation of the present disclosure. A monitoring server 400 receives information regarding the abnormal state of a specific device from a cloud server 200 or an analysis server 300 and resolves the abnormal state of the device.

A communication unit 480 receives information regarding the abnormal state of a first refrigerator, sensing information with respect to the information regarding the abnormal state, and information regarding a notification message recipient with respect to a first refrigerator from a cloud server 200. Further, the communication unit 480 transmits the information regarding the abnormal state described above or operation information required for resolving the abnormal state to the first refrigerator. According to an implementation, the operation information is required for follow-up measures, for example, optimal setting information, information regarding a customer service schedule to resolve the abnormal state determined based on the information regarding the abnormal state provided by the cloud server 200.

In some implementations, controller 450 determines a monitoring display unit managed by a representative of the first refrigerator to output the information received by the communication unit 480. The monitoring server 400 may generate information to be transmitted to a computer screen managed by a plurality of monitoring representatives and output information on the screen. The determined monitoring display units 460a to 460n output the information.

When predetermined operation information (for example, information regarding a customer service schedule or optimal setting information) is generated between the monitoring representative and a user of the refrigerator based on the outputted information, the communication unit 480 of the monitoring server 400 may transmit the predetermined operation information. The operation information may be stored in a storage unit 470 to determine a processed state in a subsequent step. An implementation will be described in detail based on each of the above-described components.

Figure 6:
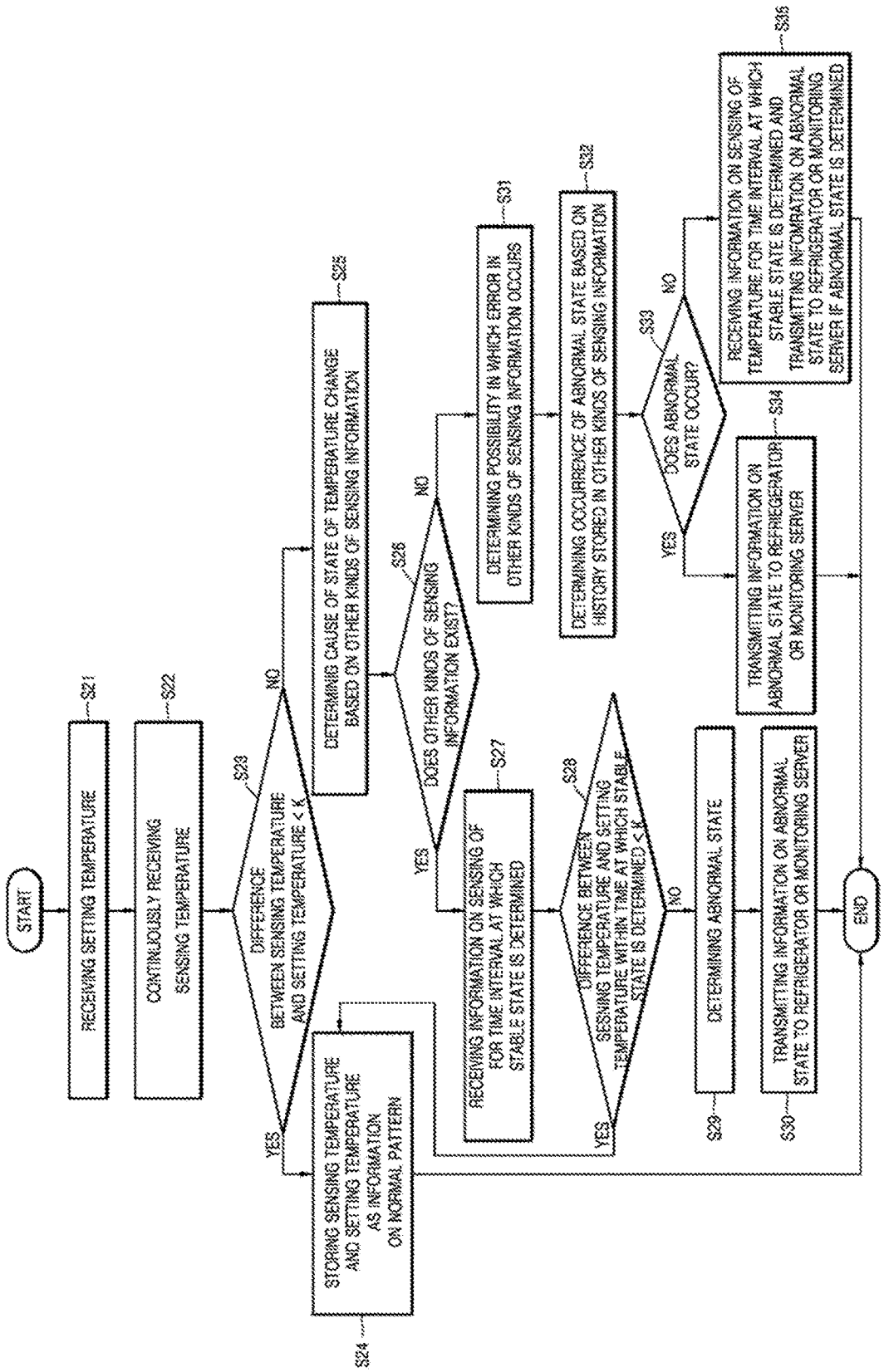
FIG. 6 shows an example of a process of determining an abnormal state based on information on sensing of temperature by a cloud server according to an implementation of the present disclosure.

FIG. 6 shows an example of a process of, by a cloud server, determining an abnormal state based on information on sensing of a temperature according to an implementation of the present disclosure. A setting temperature of a refrigerating compartment or a freezer compartment (the setting temperature or a notch temperature) may be constant or the setting temperature may be gradually increased or decreased based on machine-learning artificial intelligence. In some scenarios, the temperatures sensed in the refrigerating compartment and the freezer compartment are continuously changed by actions of putting articles in the refrigerator and taking articles out of the refrigerator, an opening of a door, an operation of a compressor, and the like. As such, a cloud server 200 may determine the abnormal state based on the change in the temperature sensed in the refrigerator, and whether the changed temperature converges to the setting temperature.

In the example of FIG. 6, the cloud server 200 receives the setting temperatures of a refrigerating compartment and/or a freezer compartment of a first refrigerator (S21). In some scenarios, e.g., where the setting temperature is not changed frequently, the setting temperature may only be transmitted when a change in the setting temperature occurs. Then, the cloud server 200 may receive (e.g., continuously) the sensing temperatures of the refrigerating compartment and/or the freezer compartment (S22).

In some implementations, if a difference between the received sensed temperature and the setting temperature is less than a threshold magnitude (S23), then the cloud server 200 stores the setting temperature and sensing temperature of the refrigerator as information on normal pattern (S24). In some implementations, an analysis unit 300a or an analysis server may also store the setting temperature and the sensing temperature of the refrigerator as information regarding a normal pattern. For example, the setting temperature and the sensing temperature of the refrigerator may be stored as information regarding a normal pattern with respect to the temperature.

In some implementations, the cloud server 200 identifies whether the difference between the received sensing information and the setting information is equal to or greater than a threshold magnitude (S23). In some scenarios, the cloud server 200 determines whether the changes in temperature occur based on other kinds of sensing information (e.g., information regarding sensing of the door, information regarding sensing a compressor's operation, and the like) (S25).

After this determination, if there is sensed information that enables a temperature change (S26), for example, when the door is opened or the compressor performs an additional operation, then the cloud server 200 receives (e.g., continuously) the information regarding sensing of the temperature from the refrigerator during a time period of a confirmation of a stable state (S27). As examples, the time period of a confirmation of a stable state may be a time required for the temperature to reach a stable state after the door is opened, or a time required for the temperature to be in the stable state corresponding to the operation of the compressor.

The time at which the stable state is reached may be predetermined or may vary depending on a magnitude of the temperature change. In some implementations, if the difference between the sensed temperature and the setting temperature is within a threshold magnitude during the time at which the stable state is determined (S28), then the cloud server 200 may determine that the temperature reaches the stable state.

In some scenarios, after the time at which the stable state is reached, the temperature may not be in the stable state and the difference between the sensing temperature and the setting temperature may be greater than or equal to the threshold magnitude (e.g., K), for example, when the temperature is decreased or increased continuously or when the temperature is outside of a difference between the sensing temperature and the setting temperature. In such scenarios, the cloud server 200 may determine this state as the abnormal state (S29). If the abnormal state is determined, then the information indicating the abnormal state (information regarding the abnormal state) is transmitted to a refrigerator 100 or a monitoring server 400 (S30), and the refrigerator 100 or the monitoring server 400 may perform various operations to resolve the abnormal state.

In some implementations, when there is no other type of sensing information that may justify a temperature change in step S26, the cloud server 200 determines whether an error regarding other types of sensing information has occurred. For example, an abnormal state may correspond to the opening of the door not being detected, or an operation of the compressor not being sensed.

To this end, the cloud server 200 may determine an abnormal state based on previous information regarding sensing of the door or the information regarding sensing of the compressor (e.g., historical information stored in the storage unit) (S32). If the information regarding sensing of the door or the information regarding sensing of the compressor has not been properly received or sensed, then the cloud server 200 may determine that the abnormal state has occurred (S33) and may transmit the information regarding the abnormal state to the refrigerator 100 or the monitoring server 400 (S34). The refrigerator 100 or the monitoring server 400 may then perform various operations to resolve the abnormal state.

On the other hand, if no problems are detected in the information regarding sensing of the door or the information regarding sensing of the compressor, based on the past history, then the cloud server 200 may determine that an abnormal state has not occurred. When the difference between the temperatures is continuously maintained or increased and is determined as the abnormal state by receiving the information regarding sensing of the temperature at a time interval until the stable state is reached, then the information regarding the abnormal state may be transmitted to the refrigerator 100 or to the monitoring server 400 (S35). The refrigerator 100 or the monitoring server 400 may then perform various operations to resolve the abnormal state.

As shown in the example of FIG. 6, in the case of home appliances (e.g., a refrigerator) connected to a network, a failure state of the home appliance may be detected in advance, and a customer may be notified of the failure state of the product. For example, information regarding an operation state of the home appliances may be sensed, and the home appliance may transmit the sensed information to a cloud server. The cloud server and/or an analysis server may predict a failure of the product in advance based on the received information, and may proceed to perform various operations to repair or provide customer service.

As such, implementations disclosed herein may mitigate occurrences of scenarios where problems with a product are recognized only after a failure of the product has occurred. This may enable more efficient and faster repair of products, and a user may not need to wait for a long period of time to repair the product.

In addition, problems may also arise when an abnormality of the product occurs, and the user directly calls for service to solve the problem, but may not be able to accurately explain the problem. Therefore, the user may erroneously notify the service center of a state of a defect of the product, causing repairs to be performed twice or more.

Such problems may be mitigated according to implementation of the present disclosure, in which sensing information of home appliances, such as refrigerators, are transmitted (e.g., continuously) to a cloud server, and a determination or prediction of failures is performed proactively based on the collected information, and users are notified of such failures or potential failures of the home appliances. Further, implementations may enable repairs to be preemptively performed in an abnormal state of home appliances, thus helping to prevent the abnormal state from causing failure of the home appliances, thereby enabling quick and efficient product management and increasing a lifespan of the product.

According to implementations of the present disclosure, sensing information generated during operation of a refrigerator may be various, some examples of which are described as follows. These kinds of information may be generated by various sensors shown in FIG. 3, or may be generated using a sensor other than the sensor of FIG. 3.

Examples of sensing information transmitted online through a network by the refrigerator are described as follows.

Setting temperature and sensing temperature of a refrigerating compartment, setting temperature and sensing temperature of a freezer compartment, and door open information are examples of basic information that may be used to monitor a change in temperature and to determine whether the refrigerator is in an abnormal state or a normal state, based on changes in temperature.

According to an implementation, information regarding an elapsed time after installation of the refrigerator, and installation information of the external environment of the refrigerator are examples of information regarding the installation of the refrigerator. Such information may include, for example, a distance between the refrigerator and a surrounding wall, and an elapsed time after the refrigerator has been installed. The cloud server 200 may determine the abnormal state of the refrigerator by measuring the internal temperature of the refrigerator during the elapsed time after the refrigerator is installed.

In this case, one or more servers (e.g., cloud server 200) and the refrigerator 100 may transmit and receive the temperature information sensed in the refrigerator 100 at a short period when data is transmitted for a predetermined time period based on a time point at which the refrigerator is initially installed. Such implementations may enable more precise determination of whether the state of the refrigerator is in a temporal low cooling state occurring during the initial installation of the refrigerator or an abnormal state.

Further, when the refrigerator supports a special mode, the information on special mode setting is also included in the sensing information. For example, even though the information on special mode setting is analyzed by the cloud server and the abnormal state temporarily occurs, it is possible to determine whether the state of the refrigerator is in the abnormal state or the normal state based on the continuously received sensing information.

With respect to temporal noise, low cooling, excessive cooling, an occurrence of frost, and the like, the cloud server 200 may distinguish a special mode and a general mode (not including the special mode), and the cloud server 200 may determine the abnormal state according to different techniques corresponding to each mode. Thus, the cloud server 200 may determine the abnormal state depending on the special mode. In some implementations, the setting information may only be transmitted when the setting information is newly set or changed. Alternatively, in some implementations, the setting information may be transmitted together with other kinds of sensing information.

In addition, information regarding operation of the compressor (Comp), information regarding an operation state of the motor, and information regarding an operation pattern of the compressor may be included in sensing information. The information regarding operation of the compressor and the information regarding the operation state of the motor may be utilized to identify a cause of a temperature change when the change in temperature is determined to correspond to an abnormal behavior.

If the compressor is not operated properly or the motor is not operated properly, the temperature may be continuously increased or decreased. The cloud server or the analysis server determines the abnormal state of the compressor and the motor at the time point when the temperature is changed so as to generate information on the abnormal state.

The sensing information may include the normality or abnormality of the sensor and the operation pattern of the sensor (e.g., as meta-information of the sensor). Information such as a defrost cycle, an amount of ice used, an amount of water used, pressure of the water supplied in the refrigerator, and an amount of a filter used is also sensed and transmitted continuously to the server. As a result, when a problem in a water pressure occurs or a filter (a water filter, an air purification filter, and the like) is determined to be replaced, the cloud server 200 may transmit a replacement cycle to the refrigerator as information on the abnormal state or the operation information.

In scenarios where ice is used in the refrigerator, information regarding an amount of ice that is used may be transmitted to the cloud server 200. In some implementations, if it is determined that a user uses a larger amount of ice than a predicted or prepared amount of ice, then the cloud server 200 may transmit operation information to the refrigerator to perform various operations, such as controlling a display unit 160 to output information related to a proper usage of ice (e.g., an amount of ice used per hour or a time taken to produce ice).

In scenarios of sensing water pressure, by measuring the pressure of the water that is supplied to the refrigerator, implementations disclosed herein may enable notifying a user of an excessive water pressure or a low water pressure, and may perform various operations, such as recommending an optimal usage to the user.

Alternatively, in some implementations, the cloud server 200 may determine, as a result of sensing of the water pressure, information that a user uses an excessive amount of water. Accordingly, this information may be transmitted by the cloud server 200, together with operation information, to the refrigerator such that the display unit 160 outputs a recommended water usage that does not cause the low water pressure/high water pressure. In some implementations, a time duration for the water to reach a proper temperature may be outputted to the display unit 160, which may notify the user to not use the water until that time.

Further, setting information on a function set by the user may be transmitted to the cloud server 200, for example periodically or at a time point when the function is changed. Further, the cloud server 200 may recommend setting information (e.g., optimal setting information) obtained from the sensing information determined during operation of the refrigerator based on setting information regarding the function set by the user. Further details of this are described with reference to FIG. 8, below.

As a particular example, a time interval at which the sensing information (data) is transmitted may also be adjusted. Although various types of sensing information may be transmitted, a part of the sensing information may be transmitted at a shorter time interval when an abnormal state occurs, which may enable proactive prevention or response to potential or actual failures.

Figure 7:
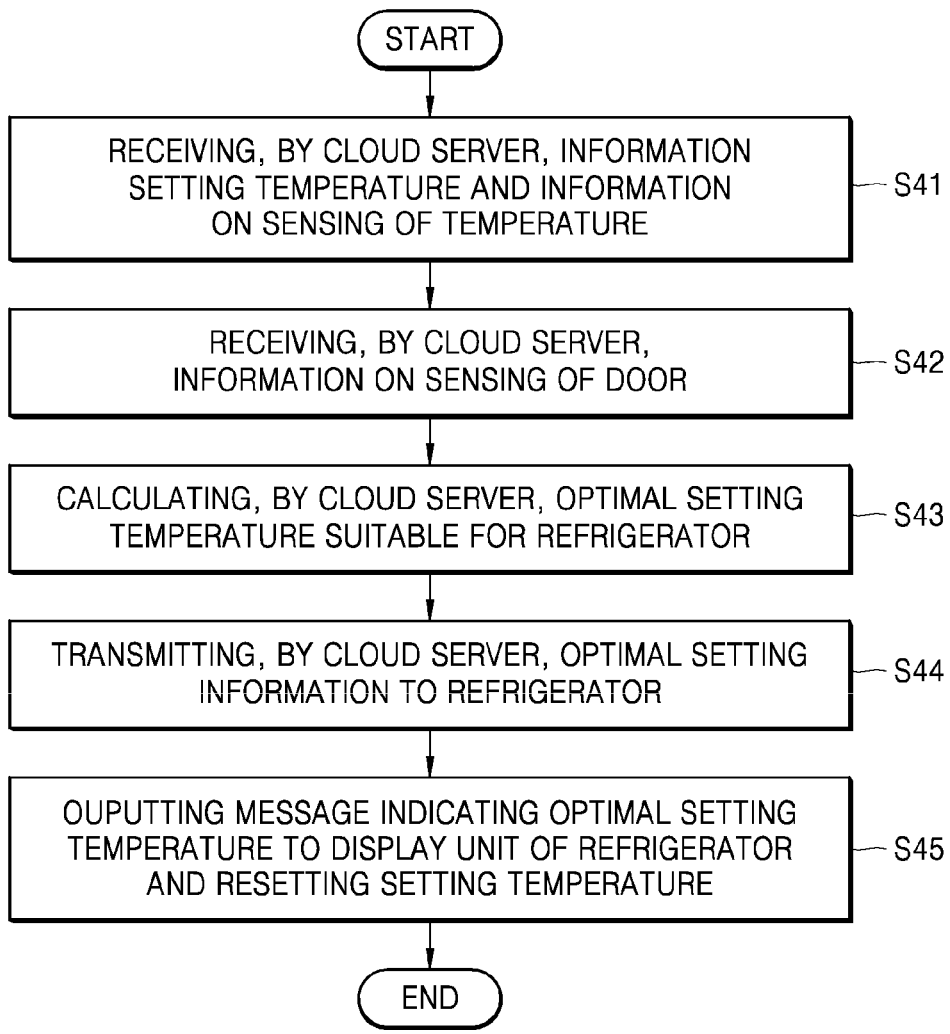
FIG. 7 shows an example of a process of recommending an optimal setting temperature to a user based on sensed temperature information according to an implementation of the present disclosure.

FIG. 7 shows an example of a process of recommending an optimal setting temperature to a user based on sensed temperature information according to an implementation of the present disclosure.

A cloud server 200 receives temperature information and information on sensing of the temperature set to the refrigerating compartment and the freezer compartment from a refrigerator (S41). Further, the cloud server 200 receives information on sensing of the door, that is, information on a time point when the door is opened and closed (S42). Then, the cloud server 200 calculates an optimal setting temperature suitable for the refrigerator based on the received information (S43). This will be described in more detail. The cloud server 200 or an analysis server 300 determines whether the operation of the refrigerator is in the abnormal state based on a current state of opening and closing the door, a setting temperature, and the information on sensing of the temperature.

After determination, when there is the abnormality in a current setting temperature, for example, when the door is frequently opened and closed based on a use pattern of the user (opening and closing the door) and the setting temperature is too low, an overload may occur. Further, in this process, the cloud server 200 or the analysis server 300 may determine that it takes a long time to enter the stable state after the door is opened based on the information on sensing of the temperature.

That is, if the operation of the refrigerator is determined to be in the abnormal state based on information on a combination of the temperature set by the user and the use pattern, the cloud server 200 transmits the information on the optimal setting temperature to the refrigerator so as to adjust the setting information (S44). According to an implementation, the information on the optimal setting temperature is operation information. Further, information on the abnormal state may be transmitted together during transmission of the information on the optimal setting temperature.

As a result, when a display unit 160 of a refrigerator 100 outputs the received information on the abnormal state (a message indicating that the temperature setting is inadequate) and operation information (a message indicating the optimal setting temperature), and the user recognizes the received information on the abnormal state and the operation information, an optimal temperature of the refrigerating compartment or the freezer compartment may be reset automatically or manually by the user (S45). The setting temperature information reset in this process is transmitted to the cloud server 200 back and may be a basis for determining the subsequent operation state of the refrigerator.

The cloud server 200 may determine the optimal setting temperature by analyzing the setting temperature set by the user and the change pattern of the temperature in the refrigerator. Further, the cloud server 200 may recommend optimal temperature setting by analyzing previous setting temperature and conditions of the installation environment for the refrigerator (the external temperature and external humidity values).

Figure 8:
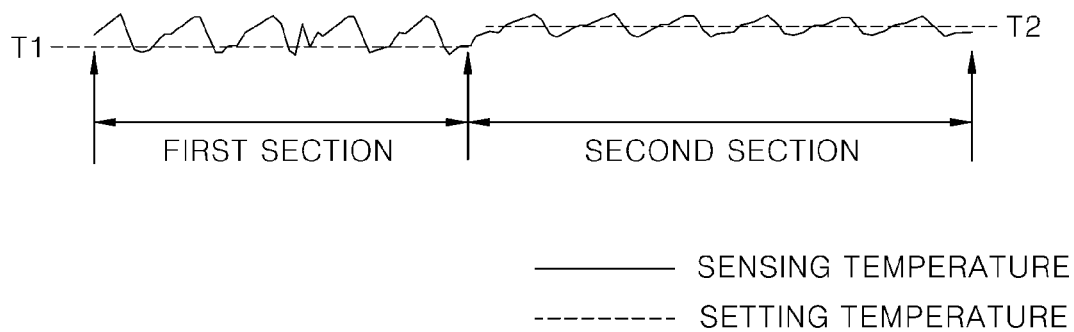
FIG. 8 shows an example of changing a setting temperature depending on a change of a sensing temperature according to an implementation of the present disclosure.

FIG. 8 is an example of changing a setting temperature depending on a change in sensing temperature according to an implementation of the present disclosure.

FIG. 8 shows that the sensing temperature repeatedly increases and decreases in a first time section when the setting temperature is set to T1. A cloud server 200 may determine that a magnitude of the increase and decrease of the sensing temperature exceeds a threshold level, so that the refrigerator is determined to be in an abnormal state in which the temperature setting causes an unstable operation of the refrigerator.

Then, as shown in the example of FIG. 8, the cloud server 200 may transmit a message to reset the setting temperature to T2, where the setting temperature may be reset to T2 directly by the user or automatically by the refrigerator. As a result, in the second time section, the magnitude of the increase and decrease of the temperature sensed by the refrigerator may be decreased so as to maintain a stable operation state.

In the example of FIG. 8, the setting temperature is increased when there is a greater gap between a maximum value and a minimum value in the change pattern of the temperature sensed by the temperature sensor in the refrigerator. In some implementations, the setting temperature may be changed by comparing an external temperature with an external humidity. For example, an accuracy of determining an abnormal state may be improved by analyzing a temperature in the refrigerator based on installation information regarding components that are provided outside of storage spaces of the refrigerator.

A cloud server 200 analyzes a change pattern of temperature and humidity outside of the refrigerator sensed by a temperature and humidity sensor provided outside to analyze a poor environment that has a bad influence on an operation of the refrigerator, and may thus recommend an appropriate installing environment and usage of the refrigerator. Further, in scenarios where the refrigerator is installed in an inclined position to the installation surface, the cloud server 200 may determine that the refrigerator is in an abnormal state based on the sensed information regarding changes in temperature, humidity, or operation states of a compressor, which may be generated depending on when the refrigerator is installed.

Figure 9:
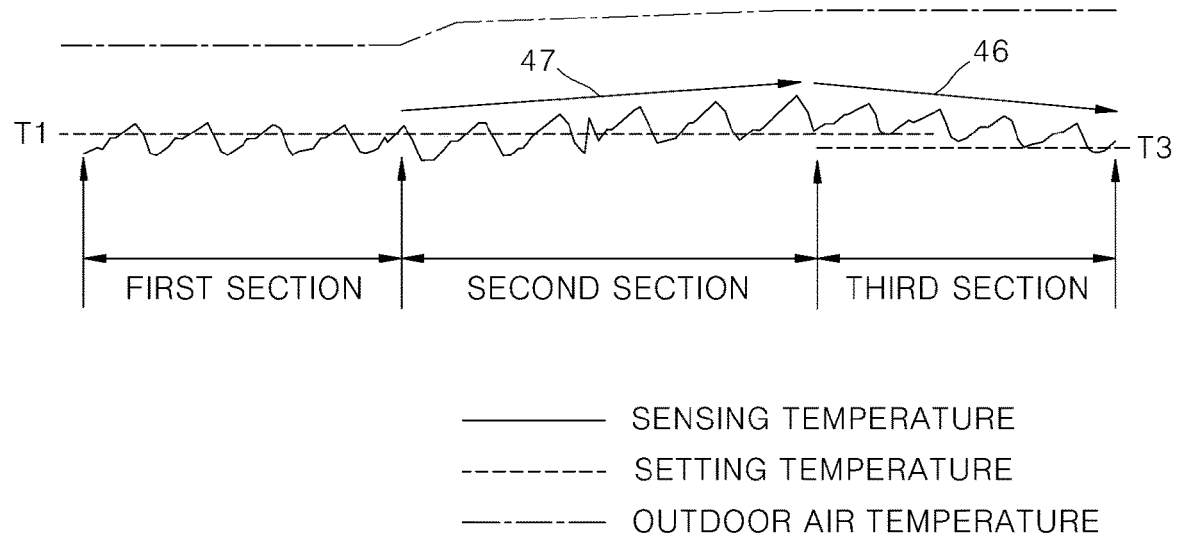
FIG. 9 shows an example of a process of resetting a setting temperature based on an outdoor air temperature according to an implementation of the present disclosure.

FIG. 9 shows an example of resetting a setting temperature by reflecting an outdoor air temperature, according to an implementation of the present disclosure. In this example, in a first time section, the outdoor air temperature is in a relatively stable state, and a temperature sensed in a refrigerator is also stable. In a second time section, the outdoor air temperature and the temperature sensed in the refrigerator are increased (e.g., continuously) as indicated by arrow 47, and the outdoor air temperature and the temperature sensed in the refrigerator are transmitted (e.g., continuously) to a cloud server 200.

The cloud server 200 determines an abnormal state in which freshness in the refrigerator may not be maintained due to an increase in external temperature, based on received information regarding outdoor air temperature and information sensed in the refrigerator. As shown in the example of FIG. 9, the cloud server 200 may transmit information regarding a resetting temperature for the refrigerator so as to lower the setting temperature to T3. According to some implementations, the transmitted information is the operation information of the refrigerator.

When the setting temperature is adjusted to T3 by the refrigerator 100, a temperature in the refrigerator gradually decreases in a third time section, as indicated by arrow 46 in FIG. 9.

In some implementations, the techniques related to temperature change discussed in relation to FIGS. 8 and 9, above, may be applied to a monitoring server 400. As a result, when a user inquires to a customer center regarding an abnormal operation of the refrigerator, the monitoring server 400 may determine the abnormal state based on information regarding monitoring of the previous change, or may transmit the operation information to the refrigerator 100 to resolve the abnormal state.

In addition, some implementations disclosed herein may enable recommending a proper usage to a user based on information regarding opening and closing of the door. For example, door opening and closing time information may be sensed by a door sensor, and may be transmitted to the cloud server 200. The cloud server 200 determine and transmit information regarding an abnormal state to the refrigerator 100, for example when the door is opened for a long period of time, thereby warning the user that the door is opened. For example, an audible alert may be output by a speaker provided in the refrigerator, or a visual alert may be displayed on a display unit 160, or a notification message may be transmitted to a smart phone (e.g., a registered smart phone) of a user.

Further, when the door is determined to be frequently opened and closed based on the door opening and closing time information sensed by the door sensor, a message indicating an effective usage may be output to the display unit 160.

Further, the cloud server 200 may warn of reduced/excessive cooling based on an opening state of the door and the change pattern of the temperature in the refrigerator together with the temperature sensor and may recommend a method of coping with the reduced/excessive cooling to the user. For example, as shown in FIGS. 8 and 9, the cloud server 200 may analyze the sensed temperature change at time points when the door is opened and closed. Further, if the door is not opened frequently, a method of saving power of the refrigerator may be provided to the refrigerator.

For example, as shown in FIG. 9, after a door of the refrigerator is opened and closed at an end of the first time section, if the temperature rises in the second time section, then the cloud server 200 may determine an abnormal state in which the door is not properly closed.

For example, if the sensing temperature increases or decreases (e.g., continuously) for a predetermined time range, then a controller 250 of the cloud server 200 may generate information regarding the abnormal state with respect to the door opening, based on the information regarding sensing of the door, and may transmit the generated information regarding the abnormal state to the refrigerator.

Figure 10:
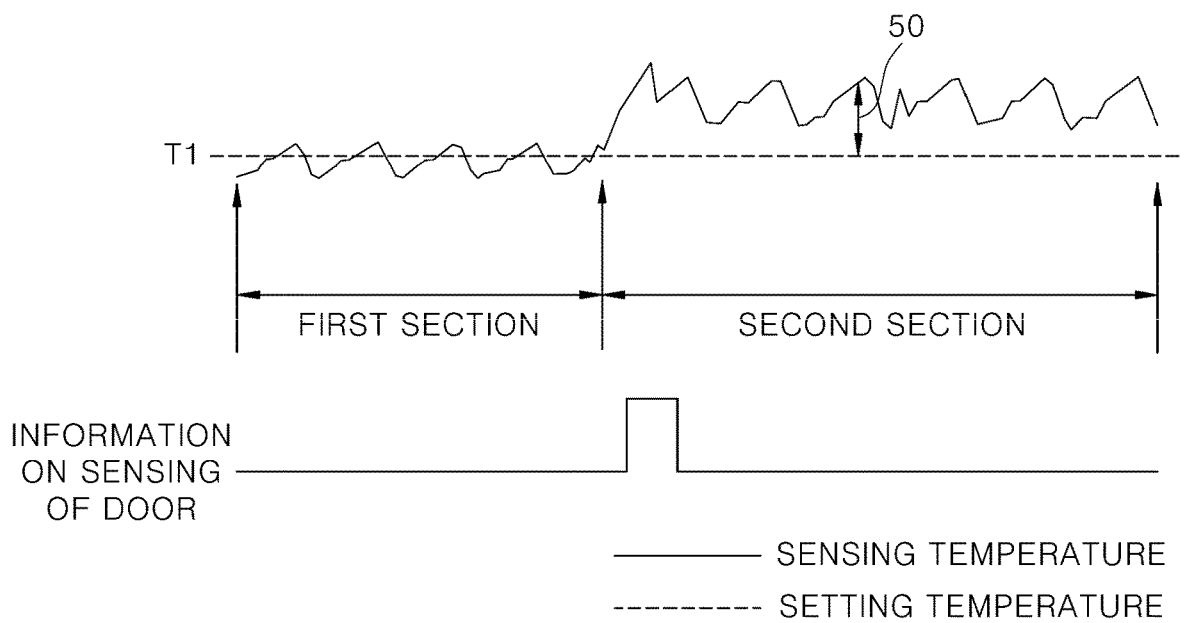
FIG. 10 shows an example of determining an abnormal state by a cloud server based on door opening information and sensed temperature information according to an implementation of the present disclosure.

FIG. 10 shows an example of a cloud server 200 determining an abnormal state based on door opening information and sensed temperature information according to an implementation of the present disclosure.

A communication unit may receive information regarding sensing of temperature, e.g., a temperature of the refrigerating compartment and/or the freezer compartment, and information regarding sensing of a door, e.g., opening and closing of the door, and whether the door is opened and then closed at an end of the first time section. In some implementations, even after the door is closed (in the second time section), the cloud server 200 may determine whether the temperature in the refrigerator is not lower than the setting temperature T1, as indicated by 50 in FIG. 10.

In some scenarios, there may have been a slight opening of the door, such that the door sensor does not detect the opening. In such scenarios, the cloud server 200 may determine that an abnormal state has occurred when the second section continues for a threshold period of time or longer. Accordingly, a controller 150 may compare the magnitude of changes in temperature, information regarding a time taken to reduce a magnitude of changes, and information regarding sensing of a door to generate information regarding an abnormal state. In some implementations, the controller 150 may notify the user of the information regarding the abnormal state, for example through a display unit 160 of a refrigerator 100, or a speaker, and the like.

Figure 11:
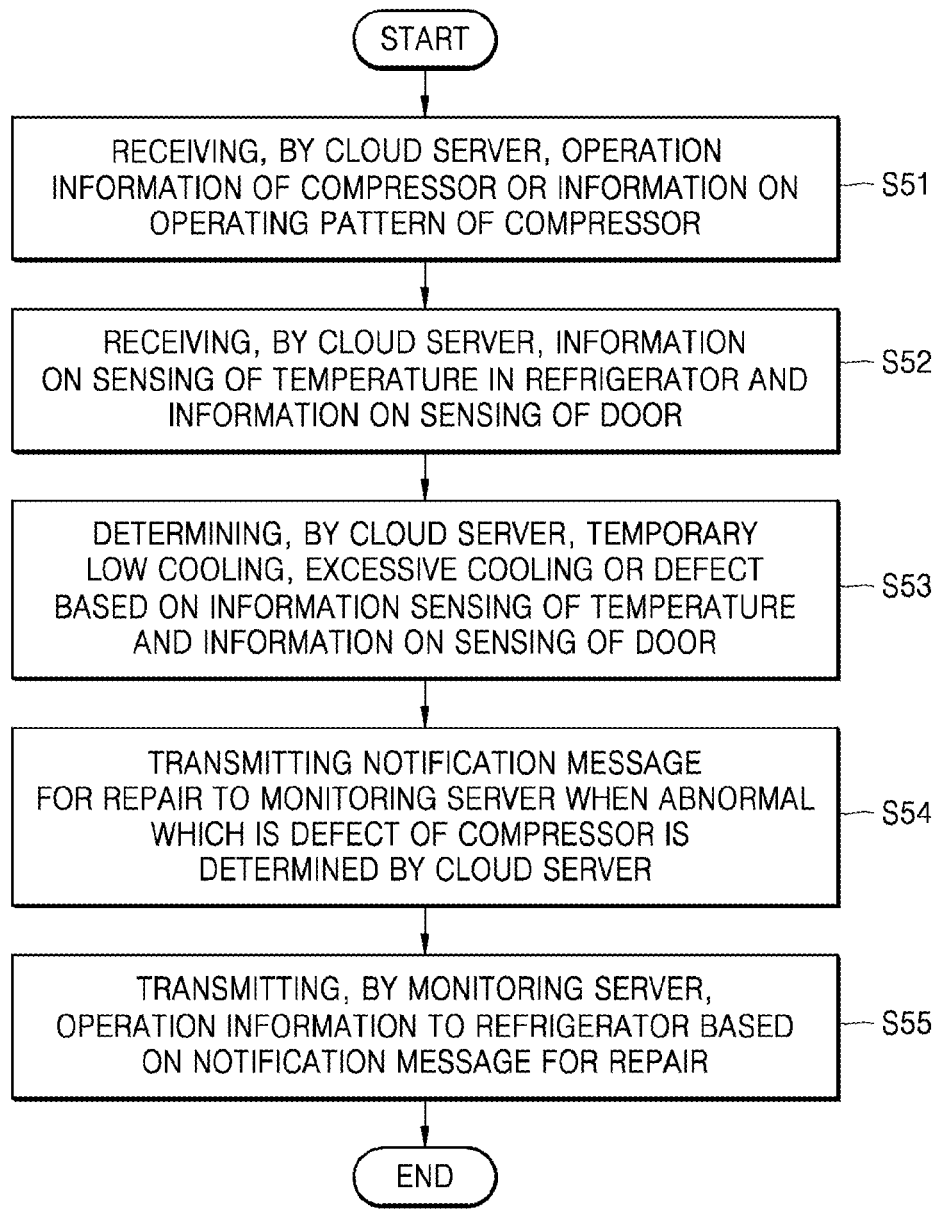
FIG. 11 shows an example of a process of determining an abnormal state by a cloud server based on information sensed during an operation of a compressor according to an implementation of the present disclosure.

FIG. 11 shows an example of a process in which a cloud server 200 determines an abnormal state based on information sensed during an operation of a compressor according to an implementation of the present disclosure.

In this example, the cloud server 200 receives information regarding an operation time and an operation pattern of a compressor sensed by a sensor (e.g., a sensor of the compressor) (S51). Further, information regarding sensing of temperature in the refrigerator and information regarding sensing of a door may also be received by the cloud server 200 during the transmission period (S52).

The cloud server 200 may determine occurrence of temporary reduced cooling, excessive cooling, or failure due to excessive use of the refrigerator, based on an operation time (e.g., an on-off time, a time interval, a number of times, and the like), and also based on an operating pattern of the compressor (S53). For example, excessive use may be determined based on a number of openings or closings of the door exceeding a threshold number, or a time period of a door opening exceeding a threshold time period.

Further, in scenarios where a temperature in the refrigerator rapidly rises after a door is opened, and an item having a high temperature is placed into the refrigerator, the compressor may temporarily perform low cooling and excessive cooling to lower the temperature in the refrigerator. Accounting for such scenarios, the cloud server 200 may analyze an operation pattern based on the information regarding opening and closing of the door, rising and falling speeds of the temperature, and the like. The cloud server 200 may determine whether this corresponds to a misuse (e.g., an excessive use) of the refrigerator, or whether the refrigerator itself is in an abnormal state. If the cloud server 200 determines that the refrigerator is in an abnormal state in which the defect of the compressor occurs, then the cloud server 200 may transmit a notification message for repair to the monitoring server (S54).

In some implementations, a monitoring server 400 receives the operation information of the compressor, the information regarding an operation pattern, the door opening and closing information, the temperature information, and the like, from the cloud server 200 in a form of a notification message for repair. The monitoring server 400 may output the received information to a specific monitoring display unit 460a. In some scenarios, this may enable a customer service representative to contact a user of the refrigerator. The monitoring server 400 may also generate operation (maintenance) information, such as a customer service schedule, for repair or optimal setting information that the user may perform. The generated operation information and/or the optimal setting information is transmitted to a refrigerator 100 (S55).

As shown in the example of FIG. 11, to determine a malfunction or a defect of the compressor, the cloud server 200 may compare information regarding sensing of the temperature of the refrigerator, pattern information (e.g., a temperature pattern in a normal state or an abnormal state) that is received from the refrigerator, or additional information regarding sensing of the door, and may generate information regarding the abnormal state of the compressor.

In this case, according to some implementation, the pattern information may define a range of temperature change for a certain time period while the compressor is operated (e.g., for a time period during which the compressor repeats turning on or off). The pattern information may define a range of temperature change corresponding to a normal state. The pattern information may also define a range of temperature change corresponding to an abnormal state.

In some implementations, the cloud server 200 may determine whether the operation pattern of the compressor is misused or is defected, based on the information regarding the operation of the compressor that is sensed by the compressor sensor and based on the information regarding the temperature sensed by the temperature sensor. The cloud server 200 may analyze a pattern of an increase or decrease in the temperature sensed by the temperature sensor to determine an abnormal state.

In some implementations, the cloud server 200 may omit step S52 in the example of FIG. 11, and may determine an abnormal state of the compressor only based on the information sensed by the compressor.

For example, in some implementations, a controller 250 of the cloud server 200 may generate information regarding an abnormal state of the compressor of the refrigerator based on information, sensed by a compressor sensor of the refrigerator, regarding a sensed operation pattern of the compressor or a continuous operation time of the compressor, and an operation period of the compressor.

The cloud server 200 may determine an operation pattern of the compressor based on the information sensed by the compressor sensor. In this process, the cloud server 200 may determine the continuous operation time of the compressor or the operation period of the compressor. When the information regarding the temperature sensed by the temperature sensor is compared with the information regarding the operation pattern of the compressor sensed by the compressor sensor, if an abnormality is determined in the temperature change, or if the temperature is not changed appropriately as the compressor is operated, then the cloud server 200 may enhance accuracy of detecting an abnormal state by using sensing values of the other sensors, when an abnormal state is determined.

Figure 12:
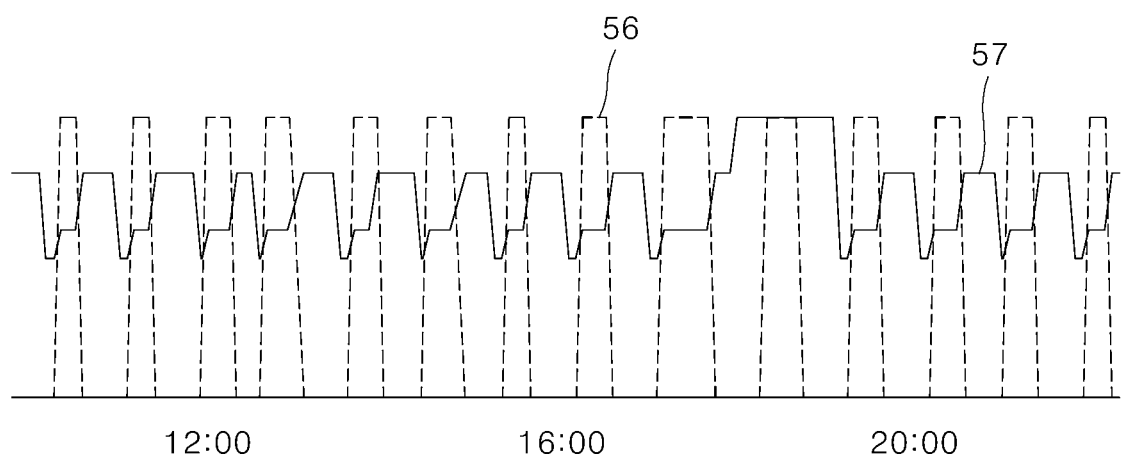
FIG. 12 shows an example of information regarding a compressor received from a refrigerator according to an implementation of the present disclosure.

FIG. 12 shows an example of information regarding a compressor received from a refrigerator according to an implementation of the present disclosure. Reference numeral 56 denotes a time point at which a compressor is turned on and off. Reference numeral 57 denotes a power level of the compressor. In some implementations, a cloud server 200 receives, from a refrigerator, information regarding a time when the compressor is turned on and off, and also receives power information of the compressor. The cloud server 200 may then determine an abnormal state of the refrigerator based on a time period at which the compressor is turned on and off and/or based on a magnitude of the power level of the compressor. For example, if the compressor is turned on for more than a predetermined duration of time (for example, 30 minutes), then the cloud server 200 may determine that an abnormality occurs in the compressor.

In some implementations, if the compressor is in an off state for at least a predetermined duration of time (for example, 30 minutes), then the cloud server 200 may determine that the compressor is in an abnormal state.

In some implementations, a state of the compressor may be determined based on an on-off time point of the compressor, and based on the magnitude of the power level of the compressor. If the state of the compressor is determined as an abnormal state, then the cloud server 200 may transmit information regarding the abnormal state to notify the monitoring server 400 of the abnormal state. In some implementations, information regarding a customer service schedule or operation information may be generated by the monitoring server 400.

In some implementations, the cloud server 200 may enhance accuracy of determining an abnormal state by utilizing a door opening and closing state, or a state of temperature in the refrigerator.

The cloud server 200 may accumulate and store information regarding a normal operation pattern, which may be a combination of various types of sensing information detected when the refrigerator is normally operated, or at a time (or directly before a time) that a defect or a failure occurs. Alternatively, in some implementations, various types of information may be stored in an analysis server 300, and the analysis server 300 or an analysis unit 300a of the cloud server 200 may determine that the compressor is in an abnormal state based on sensed information.

In some implementations, an exceptional operation pattern is defined based on the product determined to be in an abnormal state. However, if the product is not determined to be in an abnormal state but rather is in a normal state, then a combination of various types of sensing information may also be stored as information regarding a normal operation pattern. In some implementations, the exceptional pattern may be applicable to multiple appliances (e.g., an entire product group) or only to the product which has been determined as being in the abnormal state.

In some implementations, the cloud server 200 and/or the analysis server 300 may store the information regarding a normal operation pattern and information regarding an abnormal pattern, based on the information regarding sensing of temperature and the information regarding sensing of a door. For example, the stored pattern information may include a temperature change range in the normal state after the door is opened or closed, or a time that is taken to reach the setting temperature.

When the cloud server 200 and/or the analysis server 300 compares various kinds of pattern information, and the change in a time or the change in the temperature occurs which exceeding the change range defined in the pattern information, then the controller 250 of the cloud server 200 may generate the information regarding an abnormal state.

In some implementations, the cloud server 200 determines an abnormal state of the refrigerator based on various kinds of generated sensing information. For example, when a motor of the refrigerator is not operated or is excessively operated, or when a rotation speed exceeds a range of speed defined in a normal operation pattern based on the information regarding the sensed operation state or a rotation speed of the motor, the controller 250 of the cloud server 250 may generate the information regarding an abnormal state.

Further, in some implementations, the cloud server 200 may determine abnormality or normality of the sensor itself based on the sensed information. As examples, a temperature sensor, a sensor of the compressor, a door sensor, and the like, may generate a value that changes after a predetermined time. If the value is not changed at all for the predetermined period, or if the pattern of the sensed value is outside of a range of normal pattern, then the cloud server 200 may determine that the sensor itself is in an abnormal state. The abnormality in the sensor itself may cause operations of the refrigerator to be unable to be controlled, and thus a difference of the sensed values may be analyzed by the cloud server 200 to determine such an abnormal state.

As a particular example, a temperature sensor may accurately determine an entire operation of the refrigerator, thereby enhancing accuracy of the cloud server 200 determining an abnormal state. For example, the cloud server 200 may determine a state of reduced cooling or excessive cooling by analyzing a pattern of temperature change in the refrigerator. If the state of reduced/excessive cooling continues for a predetermined period of time or more, then the cloud server 200 may determine that the state of reduced cooling or excessive cooling is an abnormal state.

Further, in some implementations, the cloud server 200 may predict a degree at which frost is generated, for example, a state in which the frost is excessively generated, by analyzing the temperature in the refrigerator and a temperature pattern of a cooler (EVA). Further, if the temperature change is irregular or is outside of a range of the normal pattern, then a defect of the fan motor may also be determined.

Further, in some implementations, information regarding a defrost cycle that is performed in the refrigerator, and related time information, are also transmitted (e.g., continuously) to the cloud server 200. The cloud server 200 may determine a misuse of the refrigerator by a user based on the transmitted information, and the cloud server 200 or the monitoring server 400 may transmit, to the refrigerator, operation information which indicates a correct usage, thereby enabling a user to more effectively use the refrigerator.

During analysis of the information regarding the defrost cycle and related time information of the refrigerator, after determining a state in which frost is excessively generated, the cloud server 200 and/or the monitoring server 400 may transmit, to the refrigerator, the operation information which may include information for a user to select a function for removing the frost.

In some implementations, the cloud server 200 may analyze a transmission period of data transmitted by the refrigerator and may detect a state of power failure in a physical region where the refrigerator is disposed, and may notify a user of the sensed state of power failure.

As such, in some scenarios, implementations of the present disclosure may reduce difficulties that a user typically faces when dealing with problems in a home appliance, such as difficulties in contacting and appropriately informing a service center to request repair of the home appliance. In some scenarios, such implementations may enable a more efficient, effective, and accurate customer service center that is able to proactively establish a service plan, before the user requests repair of a product. Further, in some scenarios, such improved accuracy may mitigate problems in which a repair schedule is erroneously established based on erroneous or incorrect information which may be provided by a user, thereby reducing occurrences of multiple repair schedules being arranged for the same failure.

Figure 13:
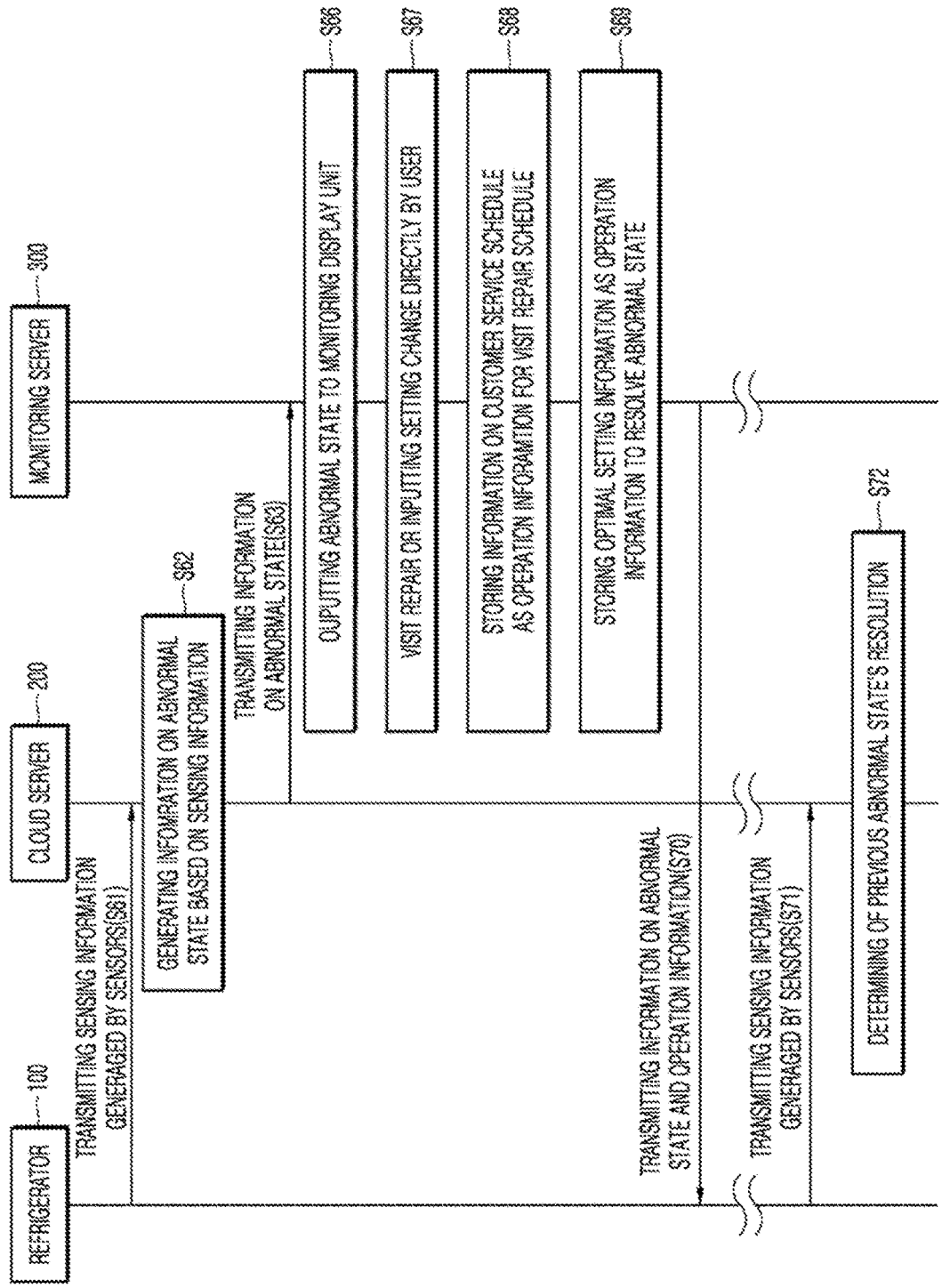
FIG. 13 shows an example of a process in which each device operates according to an implementation of the present disclosure.

FIG. 13 shows an example of operating different devices in a system according to an implementation of the present disclosure. In this example, to determine an abnormal state, a refrigerator transmits operation information (e.g., sensing information) to a cloud server 200, and the cloud server 200 determines an abnormal state of the product, and notifies a user of information regarding the abnormal state, which may include a failure state. The cloud server and/or a monitoring server may then transmit, to the refrigerator, the operation information so that the user may perform operations to resolve a misuse or a failure of the refrigerator.

As shown in the example of FIG. 13, refrigerator 100 transmits sensing information generated by one or more sensors to the cloud server 200 during an operation of a refrigerator 100 (S61). As described in various implementations, above, the cloud server 200 then determines an abnormal state of the refrigerator 100 based on the sensing information, and generates information regarding the abnormal state (S62).

According to an implementation, the information regarding the abnormal state includes various types of sensing information regarding an abnormal pattern. For example, the information regarding the abnormal state may include sensing information that is collected at various times (e.g., before, at, or after) relative to when the abnormal state of the refrigerator occurs. The information regarding the abnormal state may indicate that an abnormality is detected, based on the information sensed by one or more sensors (e.g., a temperature sensor, a door sensor, etc.).

According to some implementations, the information regarding the abnormal state is a collection of a message that indicates the abnormal state, such as "TEMP_ERROR", "DOOR_ERROR", "COMP_ERROR," as well as the sensing information.

The cloud server 200 may transmit the information regarding the abnormal state to a monitoring server 400 (S63). In some implementations, the monitoring server 400 may output information related to the abnormal state to one or more monitoring display units (e.g., monitoring display units 460a to 460n in FIG. 5), which may be managed or used by a monitoring agent (e.g., a customer service representative) of the refrigerator in which the abnormal state has occurred (S66). In some implementations, the monitoring server 400 may output the sensing information that is included in the information regarding the abnormal state to one or more monitoring display units (e.g., the monitoring display units 460a to 460n in FIG. 5), and may also output the information regarding a normal pattern that may be compared with the sensing information.

Thereafter, the customer service representative may identify the information regarding the abnormal state, input to the monitoring server 400 at least one of information regarding a visit repair or information that enables the user to directly change the setting to the monitoring server 400 (S67), and manage the history. In some scenarios, if a visit repair is required, then the customer service representative may confirm a schedule of the user and a repair representative, and may store, in the monitoring server 400, the visit repair schedule as the operation information including the customer service schedule information (S68). In this process, if it is determined that the abnormal state is resolved by replacing consumables in the refrigerator, then a process of providing the consumables may be performed to replace the consumables.

In some implementations, if a problem related to an abnormal state can be solved through a manipulation by the user, then the customer service representative may store, in the monitoring server 400, optimum setting information to resolve the abnormal state as operation information (S69).

Then, in the example of FIG. 13, the monitoring server 400 transmits the information regarding the abnormal state and the operation information to the refrigerator 100 (S70). After a predetermined step to address the problem related to the abnormal state (e.g., a repair or an optimal setting change) is performed, the refrigerator 100 transmits the sensing information that is generated by the sensors, as exemplified in S61 (S71). In this process, a sensing period and a transmission period of the sensing information with respect to the abnormal state may be less than the transmission period of S61. As such, even if the problem associated with the abnormal state has been resolved, the cloud server 200 may confirm that the abnormal state is completely resolved by receiving the sensing information at a shorter period for the predetermined time period (e.g., one day or one week).

After confirming the sensing information for a predetermined time, the cloud server 200 may determine that the previous abnormal state has been resolved (S72). Alternatively, in some implementations, the cloud server 200 may instruct the refrigerator 100 to change a sensing period and a transmission period of the data to an original period.

As shown in the example of FIG. 13, the cloud server 200 accumulates and stores information regarding a time point at which the refrigerator is installed, as well as usage information regarding usage of the refrigerator. In some scenarios, this may facilitate determining a replacement cycle of consumables in the refrigerator. If it is determined that consumables should be replaced, then the monitoring server 400 may send a notification message to a user, or may transmit the notification message in advance to the user for replacement of the consumables.

As a particular example, in scenarios where the monitoring server 400 is provided in a service center, it may be difficult to determine a cause of a malfunction of a product before customer service representatives directly determine the state of the product. According to implementations in the present disclosure, the cloud server 200 determines an abnormal state and transmits the information regarding the abnormal state, which may include sensing information, to the monitoring server 400. As such, customer service representatives in the service center may be enabled to more accurately determine the state of the refrigerator, and to provide more effective service to enhance user convenience.

The example of FIG. 13 is summarized as follows. A communication unit 480 of the monitoring server receives information regarding the abnormal state of the first refrigerator and sensing information with respect to the information regarding the abnormal state from the cloud server (S63). A controller 450 of the monitoring server allows one or more monitoring display units to output the received information (e.g., monitoring display units 460a to 460n in FIG. 5) managed by the representative of the first refrigerator and provides the information received by the communication unit 480 and the user information regarding the first refrigerator to the determined monitoring display unit (S66). The user information includes at least one of information regarding a notification message recipient, subscriber information, application ID, product information (e.g., serial, a model name, and the like).

After the monitoring display units (e.g., monitoring display units 460a to 460n in FIG. 5) output the received information, the monitoring representative transmits the abnormal state to the user by phone or by SMS via a contact number the user information includes. Further, if the schedule of the customer service is determined in order to resolve the abnormal state occurring in the process by call or SMS, and the like between the monitoring representative and the user, the schedule of the customer service is stored as operation information or transmitted to the refrigerator 100. That is, the communication unit 480 or the monitoring display units 460a to 460n may transmit the operation information required for resolving the abnormal state (the information on customer service schedule or the optimal setting information required for resolving the abnormal state) and the information regarding the abnormal state to the refrigerator 100 (S70).

In particular, the content with which the user and the monitoring representative communicate by call or SMS, and the like is stored in the storage unit 470, which is a data to determine that the monitoring is properly performed. That is, the monitoring display units (e.g., monitoring display units 460a to 460n in FIG. 5) may receive the information regarding the abnormal state or the operation information provided by the monitoring person by call or SMS via telephone number the user information includes and store the received information regarding the abnormal state or the operation information to the storage unit 470. The stored information may be retrieved to determine the monitoring state or to determine that the customer service is provided.

Figure 14:
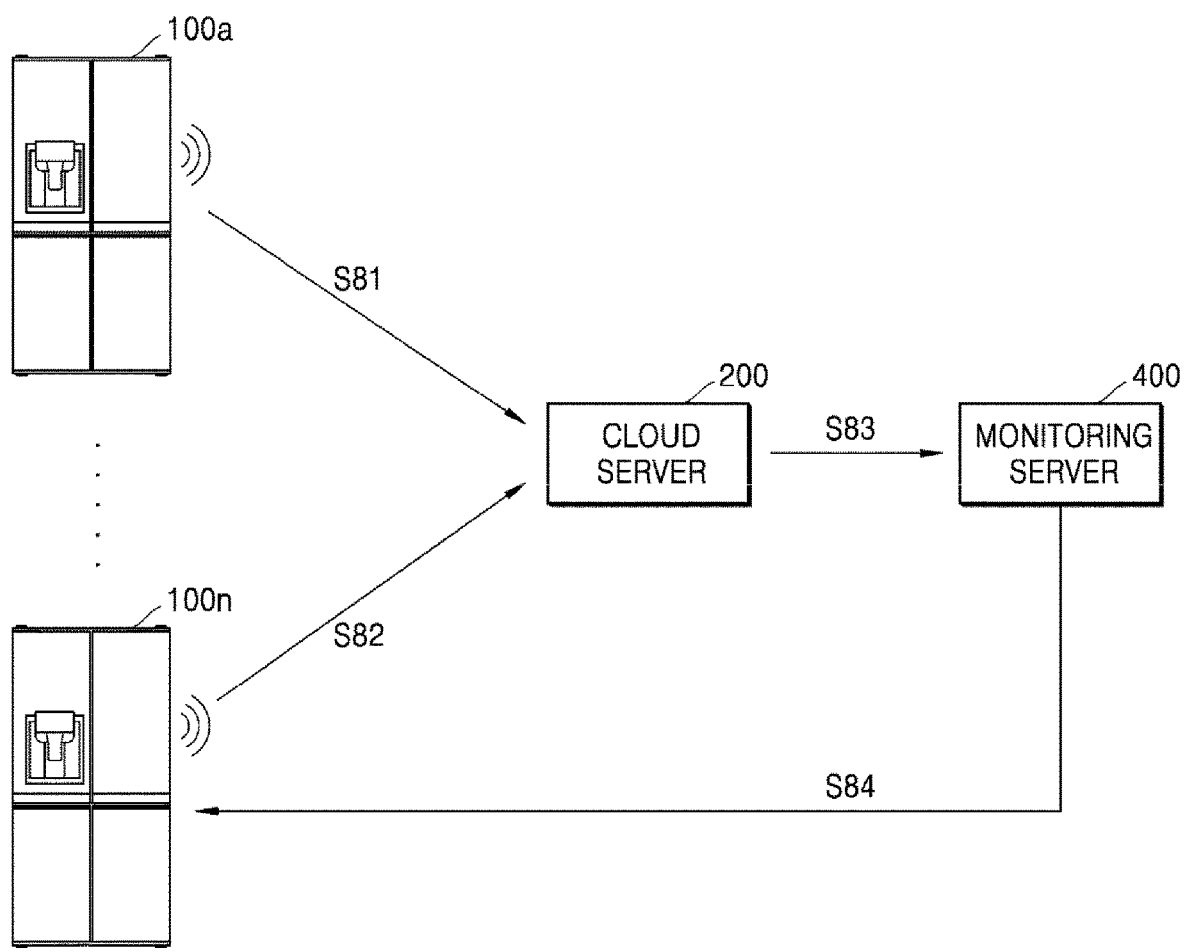
FIG. 14 shows an example of transmitting, by a plurality of refrigerators, sensed information to a cloud server according to an implementation of the present disclosure.

FIG. 14 shows an example of transmitting, by a plurality of refrigerators, sensed information to a cloud server according to an implementation of the present disclosure.

The plurality of refrigerators 100a, . . . , 100n transmit information sensed by the various sensors shown in FIG. 3 to a cloud server 200 (S81 to S82). The cloud server 200 stores the received information together with identification information of each of these refrigerators 100a, . . . , 100n and determines whether an abnormal state has occurred in each of these refrigerators 100a to 100n. In this process, the cloud server 200 accumulates and stores sensing information not about an abnormal state but rather about a normal state, to store a normal pattern.

The cloud server 200 may accumulate information sensed by one sensor in a time series and generate the normal pattern. Alternatively, the cloud server 200 may accumulate information sensed by two or more sensors in a time series and generate the normal pattern. After generating and storing the normal pattern for each particular type refrigerator for a predetermined time period, the normal pattern may be compared with the sensed information by the refrigerator in which the abnormal state occurs. As a result, when the abnormal state occurs in any one of refrigerators (for example, reference numeral 100n), the cloud server 200 may notify a monitoring server 400 of the occurrence of the abnormal state (S83) and the monitoring server 400, the refrigerator 100n or the user of the refrigerator may perform S67 to S70 as shown in FIG. 12.

As described above, the cloud server 200 may include an analysis unit 300a. Or, an analysis server 300 may operate independently with a cloud server 200. The cloud server 200 or the analysis server 300 may accumulate and store the information regarding the normal pattern and the abnormal pattern and determine whether the particular refrigerator is in the abnormal state or the normal state.

Although components included in the implementation of the present disclosure are described as being combined to one, or as being operated to operate, the present disclosure is not necessarily limited to such an implementation, and these components may operate by being selectively combined to one or more within the purpose range of the present disclosure. Further, although all of the components may be implemented as an independent hardware, a part or all of each of the components may be selectively combined to be implemented as a computer program that has a program module that performs some or all of the function combined in one or a large amount of hardware. The codes and the code segments that form the computer program will be easily deduced by those skilled in the art of the present disclosure. Such a computer program may be stored in a computer readable media that a computer can read, and can be read and implemented by the computer to implement the implementation of the present disclosure. As the storage medium of the computer program, it may include a storage media including a semiconductor recording element, an optical recording media, and a magnetic recording media. Further, a computer program that implements the implementation of the present disclosure may include a program module that is transmitted in real time via an external apparatus.

What is claimed is:

1. A refrigerator comprising:
a plurality of sensors that comprises: (i) a temperature sensor configured to sense a temperature of at least one of a refrigerating compartment or a freezer compartment of the refrigerator; (ii) a door sensor configured to sense at least one of an opening or a closing of a door of the refrigerator; (iii) a compressor sensor configured to sense an operation pattern of a compressor of the refrigerator; (iv) an ice sensor configured to sense at least one of an amount of ice or a state of the ice in the refrigerator; (v) a water sensor configured to sense at least one of an amount of water or a pressure of the water for the refrigerator; and (vi) a defrost sensor configured to sense frost that is generated in the refrigerator;
a display unit;
at least one processor; and
at least one computer memory operably connectable to the at least one processor and storing instructions that, when executed by the at least one processor, perform operations comprising:
sensing, through at least one of the plurality of sensors, sensing information that is related to the refrigerator;
storing, in the at least one computer memory, (i) the sensing information, and (ii) time information for the sensing information;
transmitting, to at least one server, (i) the sensing information and the time information that is stored in the at least one computer memory, and (ii) setting information for the at least one of the refrigerating compartment or the freezer compartment;
receiving information regarding an abnormal state of the refrigerator that is generated by at least one of a cloud server or a monitoring server based on the sensing information sensed by the at least one of the plurality of sensors; and controlling the display unit to output display information that is related to the received information regarding the abnormal state of the refrigerator, wherein the cloud server is configured to (i) accumulate and store first pattern information regarding a normal pattern and second pattern information regarding an abnormal pattern that are generated based on aggregate sensing information that is sensed by a plurality of refrigerators and (ii) generate the information regarding the abnormal state, and wherein the normal pattern is generated using accumulated information sensed by two or more sensors of the plurality of refrigerators in a time series, and wherein the at least one processor is configured to adjust a sensing period of the at least one of the plurality of sensors after the information regarding the abnormal state of the refrigerator is received.

2. The refrigerator of claim 1,
wherein the information regarding the abnormal state is generated by the cloud server based on an association between first sensing information and second sensing information, among a plurality of sensing information that is sensed by the plurality of sensors, and wherein the association between the first sensing information and the second sensing information relates to (i) the second sensing information not matching pattern information stored in the cloud server, and (ii) the cloud server determining that the second sensing information not matching the pattern information corresponds to the abnormal state, based on the first sensing information.

3. The refrigerator of claim 2, wherein the abnormal state comprises at least one of (i) a malfunction state of a first sensor that generates the first sensing information, or (ii) a malfunction state of a second sensor that generates the second sensing information.

4. The refrigerator of claim 2, wherein at least one sensor, among the plurality of sensors, which generates the second sensing information comprises at least one of the temperature sensor or the sensor of the compressor.

5. The refrigerator of claim 1, wherein the operations further comprise:
receiving, from the monitoring server, operation information for resolving the abnormal state, wherein the operation information comprises information regarding at least one of (i) a customer service schedule, or (ii) setting information for resolving the abnormal state.

6. The refrigerator of claim 5, wherein the operations further comprise:
controlling the display unit to display information related to the customer service schedule; and
accumulating and storing the sensing information that is sensed by the at least one of the plurality of sensors, with respect to the information regarding the abnormal state.

7. The refrigerator of claim 1, wherein the operations further comprise:
adaptively managing a transmission period or the sensing period for sensing information, depending on the at least one of the plurality of sensors,
wherein a first value of the transmission period or the sensing period after the abnormal state has been resolved is less than a second value of the transmission period or the sensing period before the abnormal state has been resolved.

8. The refrigerator of claim 1,
wherein the cloud server is configured to determine information regarding a first abnormal state of a compressor of the refrigerator, based on compressor sensing information that is sensed by the compressor sensor, wherein the compressor sensor is configured to sense (i) an operation pattern of the compressor of the refrigerator, (ii) a continuous operation time of the compressor of the refrigerator, and (iii) an operation cycle of the compressor of the refrigerator, and the cloud server is configured to generate the information regarding the abnormal state of the refrigerator.

9. The refrigerator of claim 1,
wherein the cloud server is configured to compare (i) temperature information related to temperatures that are sensed by and received from the refrigerator and (ii) pattern information related to an operation pattern of a compressor of the refrigerator that is generated based on compressor sensing information that is sensed by a compressor sensor, wherein the cloud server is configured to determine a first abnormal state of the compressor of the refrigerator based on comparing the temperature information and the pattern information, and wherein the cloud sever is configured to generate the information regarding the abnormal state, based on the first abnormal state of the compressor.

10. The refrigerator of claim 1,
wherein the cloud server is configured to receive (i) temperature information related to sensing a temperature of at least one of a refrigerating compartment or a freezer compartment of the refrigerator and (ii) door information related to sensing at least one of an opening or a closing of a door of the refrigerator, and wherein the cloud server is configured to generate the information regarding the abnormal state based on (i) a magnitude of a temperature change according to the temperature information, (ii) a time duration needed to reduce the magnitude of the temperature change, and (iii) the door information related to sensing at least one of the opening or the closing of the door.

11. The refrigerator of claim 10,
wherein the cloud server is configured to generate the information regarding the abnormal state based on (i) comparing at least one of the temperature information or the door information with the stored pattern information and (ii) a change in the temperature information exceeding a threshold range of the pattern information, and wherein the change in the temperature information relates to a change in time or a change in temperature of the temperature information.

12. The refrigerator of claim 10,
wherein the cloud server is configured to generate the information regarding the abnormal state with respect to an opening of a door of the refrigerator, based on (i) the door information and (ii) the temperature information indicating that the sensed temperature is continuously increased or decreased for a predetermined time range.

* * * * *